(12) United States Patent
Togo et al.

(10) Patent No.: US 9,154,373 B2
(45) Date of Patent: Oct. 6, 2015

(54) FAILURE PROTECTION METHOD AND NODE APPARATUS

(71) Applicant: FUJITSU LIMITED, Kawasaki-shi, Kanagawa (JP)

(72) Inventors: Toshihiro Togo, Kawasaki (JP); Kanji Naito, Kawasaki (JP); Toru Katagiri, Kawasaki (JP); Koji Takeguchi, Kawasaki (JP); Mineshi Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 13/863,806

(22) Filed: Apr. 16, 2013

(65) Prior Publication Data

US 2013/0294229 A1 Nov. 7, 2013

(30) Foreign Application Priority Data

May 2, 2012 (JP) ................................ 2012-105508

(51) Int. Cl.
| | |
|---|---|
| *H04L 12/24* | (2006.01) |
| *H04J 3/14* | (2006.01) |
| *G01R 31/08* | (2006.01) |
| *H04J 3/16* | (2006.01) |
| *H04L 12/26* | (2006.01) |

(52) U.S. Cl.
CPC ............... *H04L 41/0654* (2013.01); *H04J 3/14* (2013.01); *H04L 41/0663* (2013.01); *H04J 3/1652* (2013.01); *H04J 3/1664* (2013.01); *H04J 2203/006* (2013.01); *H04L 43/0882* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 2002/0141334 | A1* | 10/2002 | Deboer et al. | 370/227 |
| 2005/0271060 | A1* | 12/2005 | Kodialam et al. | 370/394 |
| 2011/0280126 | A1* | 11/2011 | Fefer et al. | 370/230 |

FOREIGN PATENT DOCUMENTS

JP 59-175224 10/1984

* cited by examiner

*Primary Examiner* — Eunsook Choi
(74) *Attorney, Agent, or Firm* — Staas & Halsey LLP

(57) ABSTRACT

A failure protection method of a network connecting between nodes by multiple working paths and a protection path is disclosed. An allocation bandwidth is determined to allocate to a detected path where a failure is detected in multiple paths being set to the multiple working paths, depending on the detected path. The detected path is switched from one of the multiple working paths to the protection path. Data to be transmitted by the detected path is transmitted by using the allocation bandwidth determined within an entire bandwidth of the protection path.

18 Claims, 29 Drawing Sheets

FAILURE PROTECTION METHOD AND NODE APPARATUS

CROSS-REFERENCE TO RELATED APPLICATIONS

This patent application is based upon and claims the benefit of priority of the prior Japanese Patent Application No. 2012-105508 filed on May 2, 2012, the entire contents of which are incorporated herein by reference.

FIELD

The embodiments discussed herein are related to a failure protection method for a network and a node apparatus.

BACKGROUND

In a network field, as to an optical transport technology of a next generation which is expected to expand applied fields in the future, an OTN (Optical Transport Network), which integrates TDM (Time-Division Multiplexing) data such as Synchronous Optical NETwork (SONET)/Synchronous Digital Hierarchy (SDH) and packet data such as Ethernet, is recommended by the International Telecommunication Union Telecommunication standardization sector (ITU-T).

Regarding the OTN, there is a specification of an Optical channel Data Unit flex (ODUflex) capable of providing a variable bandwidth in response to demand in order to effectively transmit the packet data which is the current primary traffic.

Up until now, there has been discussed a problem of protecting a transmission path with high priority in a case of switching a fault transmission line which can not be switched to a protection transmission path to a normal working transmission path which has lower priority than the fault transmission line.

Patent Document 1: Japanese Laid-open Patent Publication No. 59-175224

SUMMARY

According to one aspect of the embodiment, there is provided a failure protection method of a network connecting between nodes by multiple working paths and a protection path, the failure protection method including determining an allocation bandwidth to allocate to a detected path where a failure is detected in multiple paths being set to the multiple working paths, depending on the detected path; switching the detected path from one of the multiple working paths to the protection path; and transmitting data to be transmitted by the detected path, by using the allocation bandwidth determined within an entire bandwidth of the protection path.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Figure 1:
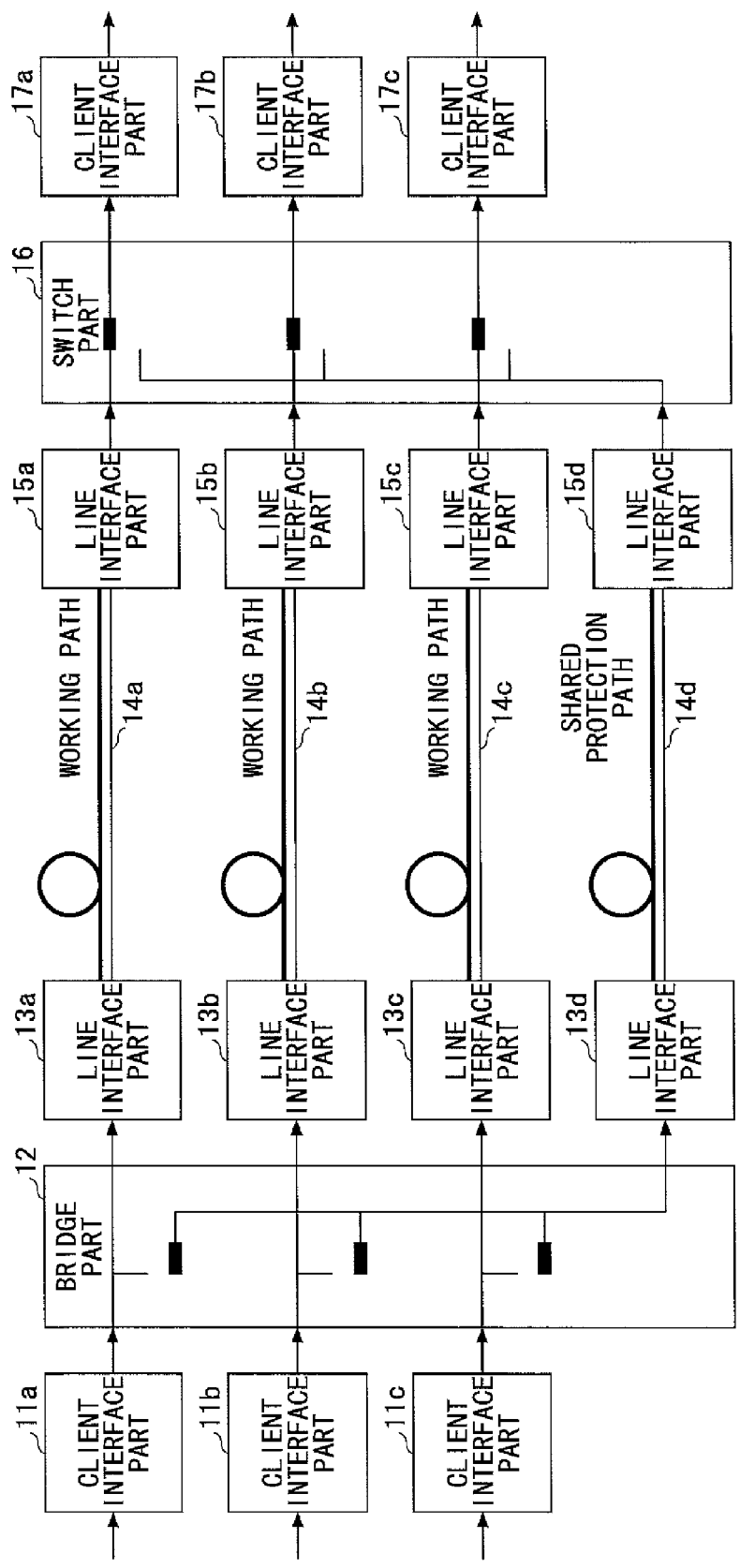
FIG. 1 is a diagram illustrating a state of a normal operation in an example of a configuration of a shared protection system in a related art.

FIG. 1 is a diagram illustrating a state of a normal operation in an example of a configuration of a shared protection system in a related art. FIG. 1 illustrates the state of the normal operation without a failure. A client signal input to a client interface (IF) part 11a is applied to a line interface part 13a via a bridge part 12. The client signal is mapped into a signal in a predetermined format by the line interface part 13a, is transmitted through a working path 14a, is demapped to an original client signal by a line interface part 15a, is supplied to a client interface part 17a via a switch part 16, and is output to an outside from the client interface part 17a.

The client signal, which is also input to client interface parts 11b and 11c, is supplied to line interface parts 13b and 13c via the bridge part 12. Moreover, the client signal is mapped into the predetermined format, is transmitted through working paths 14b and 14c, is restored to the original client signal by line interface parts 15b and 15c, is supplied to client interface part 17a, 17b, and 17c via the switch part 16, and is output to the outside from the client interface parts 17a, 17b, and 17c via the switch part 16. Also, the bridge part 12 is connected to the line interface part 13d, the line interface part 13d is connected to the line interface part 15d through a shared protection path 14d, and the line interface part 15d is connected to the switch part 16.

Figure 2:
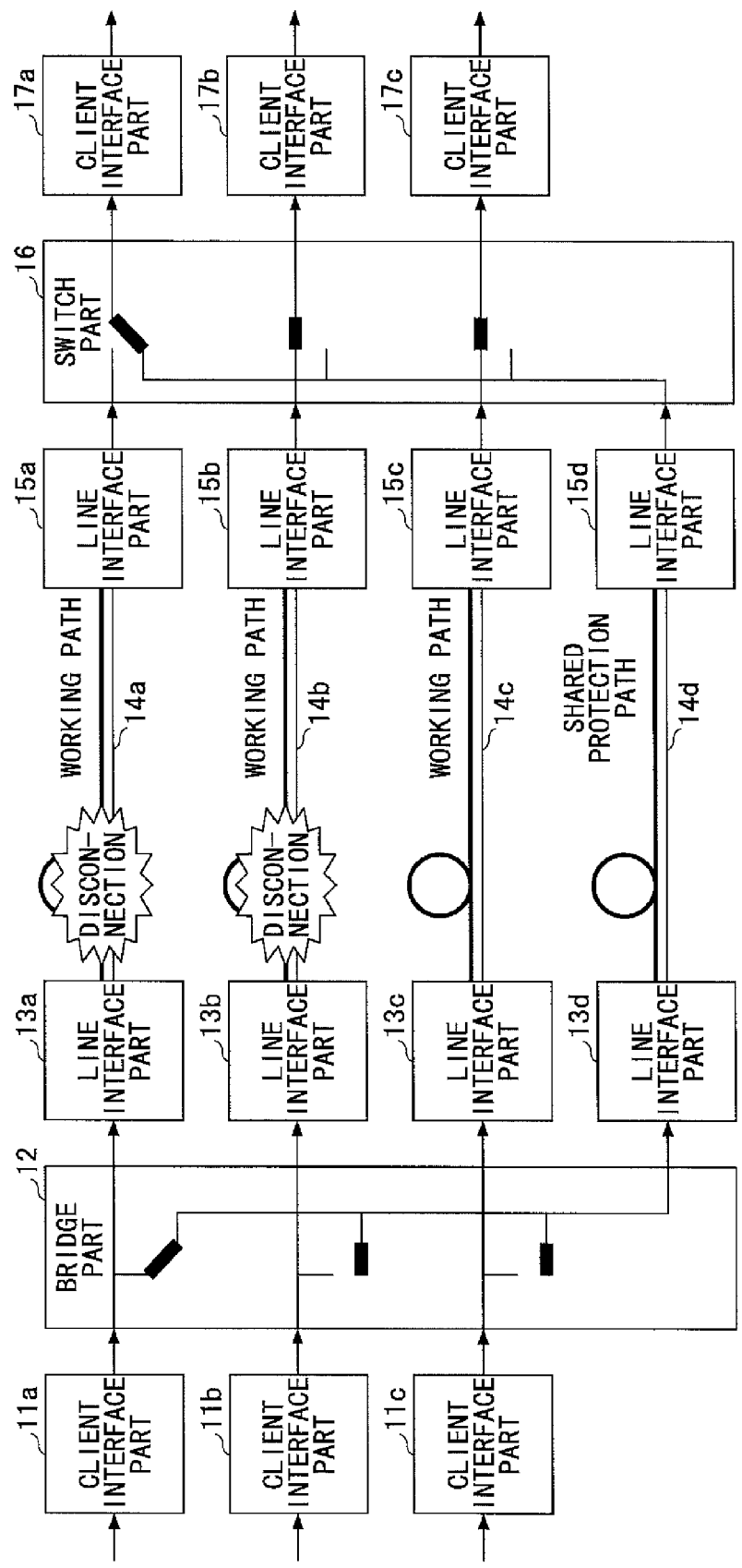
FIG. 2 is a diagram illustrating a state of double line failures in the example of the configuration of a shared protection system in the related art.

FIG. 2 is a diagram illustrating a state of a double line failure (disconnection) in the example of the configuration of a shared protection system in the related art. FIG. 2 illustrates a state in which the double line failure (disconnection) occurs. First, when a failure occurs on the working path 14a, the bridge part 12 connects the client interface part 11a to the line interface part 13d. The switch part 16 connects the line interface part 15d to a client interface part 17a, and switches the working path 14a to the shared protection path 14d, so as to protect traffic.

After that, when another failure occurs on the working path 14b having a lower priority than the working path 14a, the working path 14b is not switched to the shared protection path 14d. Thus, traffic through the working path 14b is not protected.

As described above, in a network having a configuration including plural working paths 14a through 14c and the shared protection path 14d, in a case in which failures occur on more than one of the working paths 14a through 14c and the traffic is switched to the shared protection path 14d, in general, one line alone having a higher priority is switched to protect the traffic. In this case, other failure lines remain in disconnection.

Patent Document 1 proposes a technology in which switching apparatuses 1 and 2 are connected through working paths 3, 4, and 5 and a protection path 6. Working path priority indicates an order of the working path 3, the working path 4, and the working path 5. When failures occur on the working paths 3 and 4, the working path 4 is switched to the protection path 6, and the working path 3 is switched to the protection path 5.

In the above described technology, there is a problem in which when failures occur on plural working paths, it is difficult to protect the plural working paths having the failures by the shared protection path. Also, in the technology proposed in Patent Document 1, when the failures occur on the working paths 3 and 4, the working path 4 is switched to the protection path 6, and the working path 3 is switched to the working path 5. There is a problem in which the working path 5 having the lower priority may be disconnected.

At least a method is disclosed below in which the failures on the plural working paths are protected.

In the following, embodiments of the present invention will be described with reference to the accompanying drawings.
<OTN Transmission System in First Embodiment>

Figure 3:
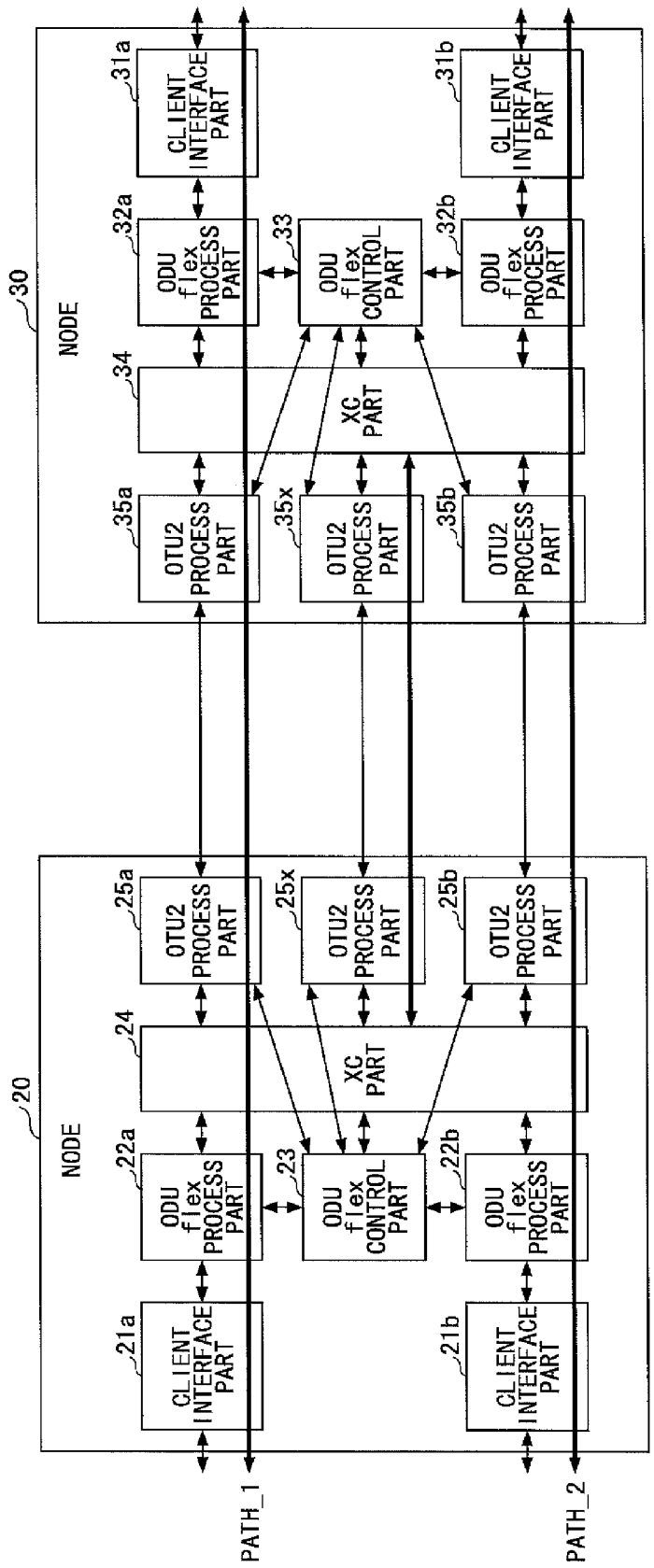
FIG. 3 is a diagram illustrating a configuration of an OTN transmission system in a first embodiment.

FIG. 3 is a diagram illustrating a configuration of an OTN transmission system in a first embodiment. In FIG. 3, in a node 20, an Ethernet frame supplied from a client is received by client interface parts 21a and 21b, and is supplied to ODUflex process parts 22a and 22b. The ODUflex process parts 22a and 22b map the Ethernet frame into an ODUflex as an accommodation format at a Lower Order (LO) side of the OTN.

In order to map into the ODUflex, an ODUflex control part 23 acquires a bandwidth to be used, a line state, and the like for each path by cooperating with each of ODUflex process parts 22a and 22b, a cross connect (XC) part 24, and Optical channel Transport Unit 2 (OTU2) process parts 25a, 25b, and 25x which are interfaces at a network side. Also, the ODUflex control part 23 determines a bandwidth of the ODUflex to be assigned for protection. After that, the ODUflex control part 23 instructs the cross connect (XC) part 24 to conduct an actual cross connect setting.

The ODUflex frames from the ODUflex process parts 22a and 22b are supplied to the OTU2 process parts 25a, 25b, and 25x at a High Order (HO) side through the cross connect (XC) part 24, to map into ODU2. Furthermore, an overhead such as Forward Error Correction (FEC) information or the like is added to the ODUflex frames mapped into the ODU2, and is transmitted as an OTU2 frame to a node 30 being an opposite node.

In order to realize multiplex accommodation to the ODU2 at the HO side of the ODUflex frame, a Tributary Slot (TS) is defined and the ODUflex is accommodated to each TS in a payload area of the ODU2 frame. The TS is a tributary slot where an OPU2 payload area being a payload portion of the ODU2 frame is divided into is portions. An OPU2 is an Optical Channel Payload Unit-k (OPUk) where k=2. A bandwidth for one TS is approximately 1.25 Gbps.

In the node 30, OTU2 process parts 35a, 35b, and 35x receive the OTU2 frame transmitted through the network and extracts the ODU2. Moreover, the ODUflex frame is demapped from the ODU2. The ODUflex frames, which are output from OTU2 process parts 35a, 35b, and 35x, are supplied to ODUflex process parts 32a and 32b via the cross connect (XC) part 34 by the cross connect setting of an ODUflex control part 33.

Each of the ODUflex process parts 32a and 32b demaps the ODUflex frame into the Ethernet frame. The Ethernet frame is supplied from each of client interface parts 31a and 31b to a client. Transmission from the node 20 to the node 30 is described above. Transmission from the node 30 to the node 20 is conducted in the same manner.

A PATH_1 connects between the OTU2 process parts 25a and 35a for bi-directional transmission with the OTU2 frame. A PATH_2 connects between the OTU2 process parts 25b and 35b for bi-directional transmission with the OTU2 frame. The PATH_1 and the PATH_2 are working paths of 8 time slots, that is, 10 Gbps. Also, a shared protection path of a bi-direction of 8 time slots, that is, 10 Gbps is provided between the OTU2 process parts 25x and 35x. In the shared protection path, the cross connect setting of the ODUflex supporting the Ethernet frame is not conducted beforehand.

Figure 4A:
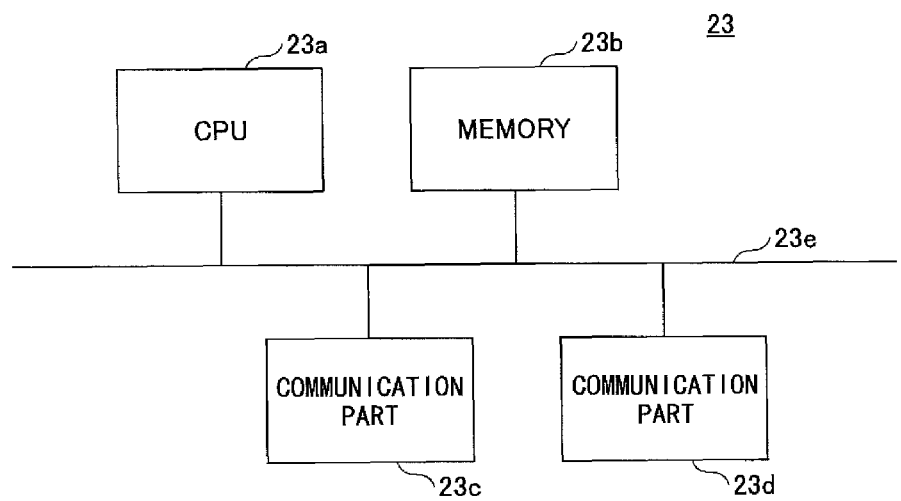
FIG. 4A and FIG. 4B are block diagrams illustrating examples of hardware configurations of ODUflex control parts in the first embodiment.
Figure 4B:
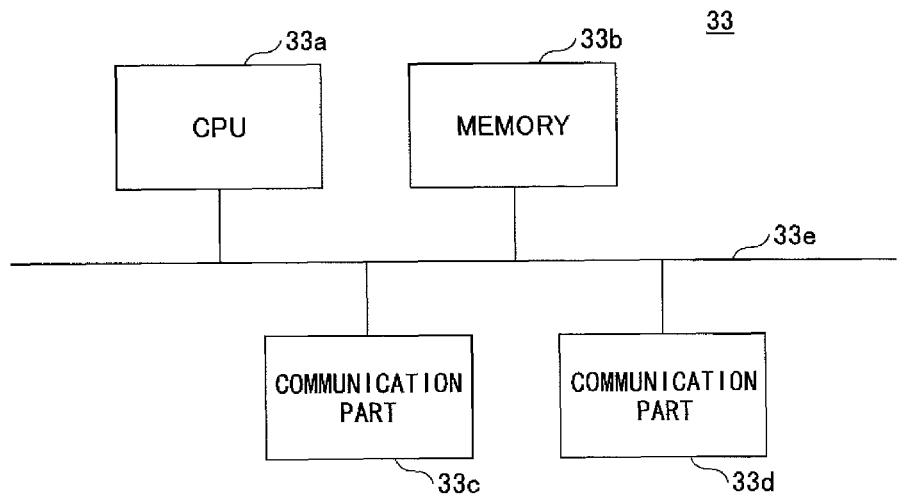

FIG. 4A is a block diagram illustrating an example of a hardware configuration of the ODUflex control part 23. FIG. 4B is a block diagram illustrating an example of a hardware configuration of the ODUflex control part 33. In FIG. 4A, the ODUflex control part 23 includes a CPU 23a, a memory 23b, and communication parts 23c and 23d. The CPU 23a, the memory 23b, the communication parts 23c and 23d are mutually connected via a bus 23e. The CPU 23a conducts each of various processes illustrated in FIG. 7 and the like by executing programs stored in the memory 23b. Also, setting data such as a threshold and the like are stored in the memory 23b. The communication parts 23c and 23d conduct communications with the ODUflex process parts 22a and 22b, the cross connect (XC) part 24, the OTU2 process parts 25a, 25b, and 25x, and the like.

In FIG. 4B, the ODUflex control part 33 includes a CPU 33a, a memory 33b, and communication parts 33c and 33d. The CPU 33a, the memory 33b, and the communication parts 33c and 33d are mutually connected via a bus 33e. The CPU 33a conducts each of the various processes illustrated in FIG. 7 and the like, by executing programs stored in the memory 33b. Also, setting data such as a threshold and the like are stored in the memory 33b. The communication parts 33c and 33d conduct communications with the ODUflex process parts 33a and 33b, the cross connect (XC) part 34, the OTU2 process parts 35a, 35b, and 35x, and the like.

<Line Failure Occurrence>

Figure 5:
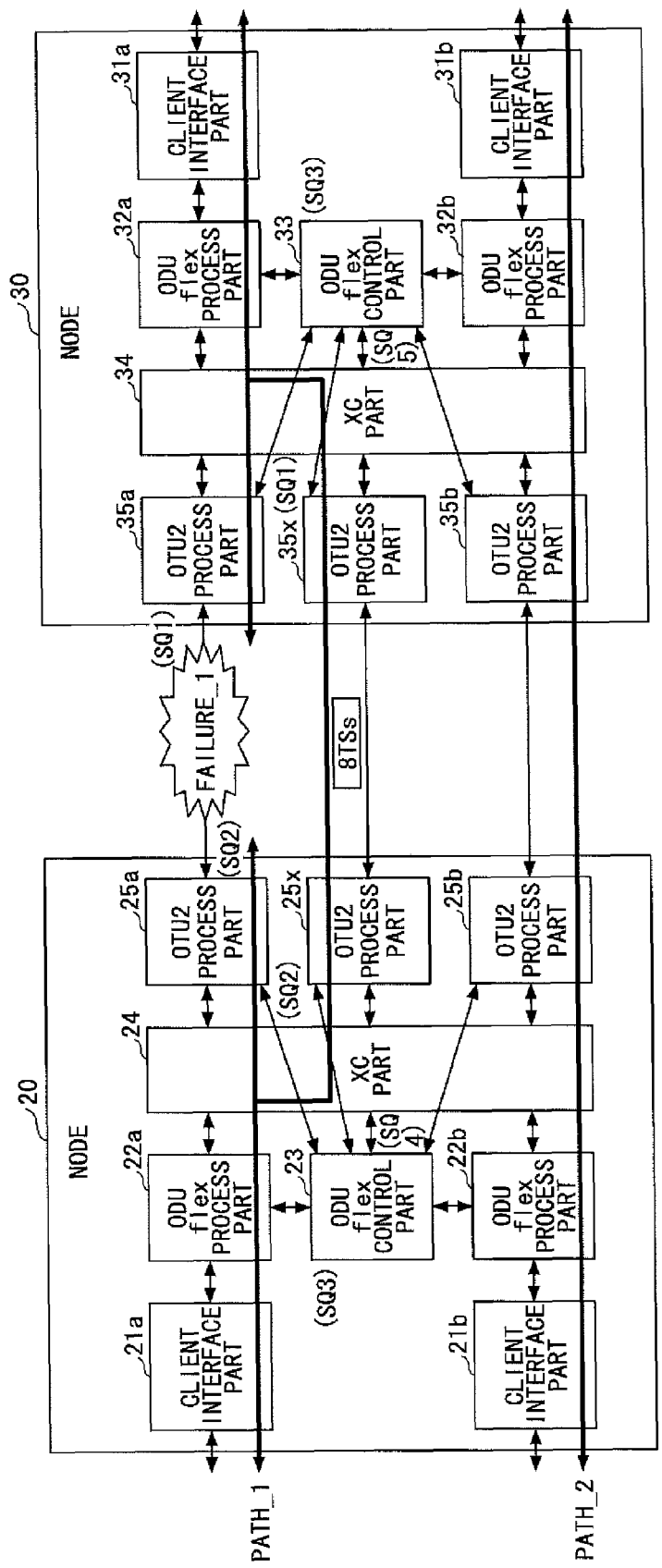
FIG. 5 is a diagram for explaining an operation when a line failure occurs in the first embodiment.

As illustrated in FIG. 5, a FAILURE_1 (line failure) occurs on the PATH_1 in a direction from the node 20 to the node 30 between the OTU2 process parts 25a and 35a. Sequence numbers are also indicated with parentheses in FIG. 5.

Sequence (SQ1): The OTU2 process part 35a of the node 30 at a receiver side detects Loss Of Signal (LOS) of the PATH_1, and the ODUflex control part 33 of the node 30 collects alarm information. After that, the ODUflex control part 33 sends the alarm information in the overhead of the OTU2 frame from the OTU2 process part 35a to the node 20. A Backward Defect Indication (BDI), General Communication Channel 0 (GCC0), Automatic Protection Switching coordination channel (APS), and the like are used.

Sequence (SQ2): The OTU2 process part 25a of the node 20 detects the alarm information from the overhead of the OTU2 frame, and reports a failure state of the PATH_1 to the ODUflex control part 23.

Sequence (SQ3): Each of the ODUflex control parts 23 and 33 of the node 20 and node 30, respectively, determines the bandwidth to be used of the shared protection path and a bandwidth to set the working path of the PATH_1, in which the FAILURE_1 occurs, to the shared protection path.

A bandwidth Bs [TS], which is set to the shared protection path for each path, is calculated by an expression (1) based on all bandwidths Ba [TS] of the shared protection path, a bandwidth Bb [TS] of the working path where the failure occurs, and a total bandwidth Bt [TS] of all working paths on which the failures occur.

$$Bs = Ba \times (Bb/Bt) \quad (1)$$

In the expression (1), since Ba=8 [TS], Bb=8 [TS], and Bt=8 [TS], Bs=8 TSs are assigned for the shared protection path of the PATH_1.

Sequence (SQ4): the ODUflex control part 23 of the node 20 conducts the cross connect setting of the ODUflex frame of the PATH_1 so as to pass the shared protection path by the bandwidth Bs [TS]. Data are transmitted via the shared protection path.

Sequence (SQ5): The ODUflex control part 33 of the node 30 instructs the cross connect (XC) part 34 to supply a shared protection path of the PATH_1 of 8 TSs from multiple shared protection paths by conducting the cross connect setting to the cross connect (XC) part 34. Then, an operation starts.

<Double Line Failure Occurrence>

Figure 6:
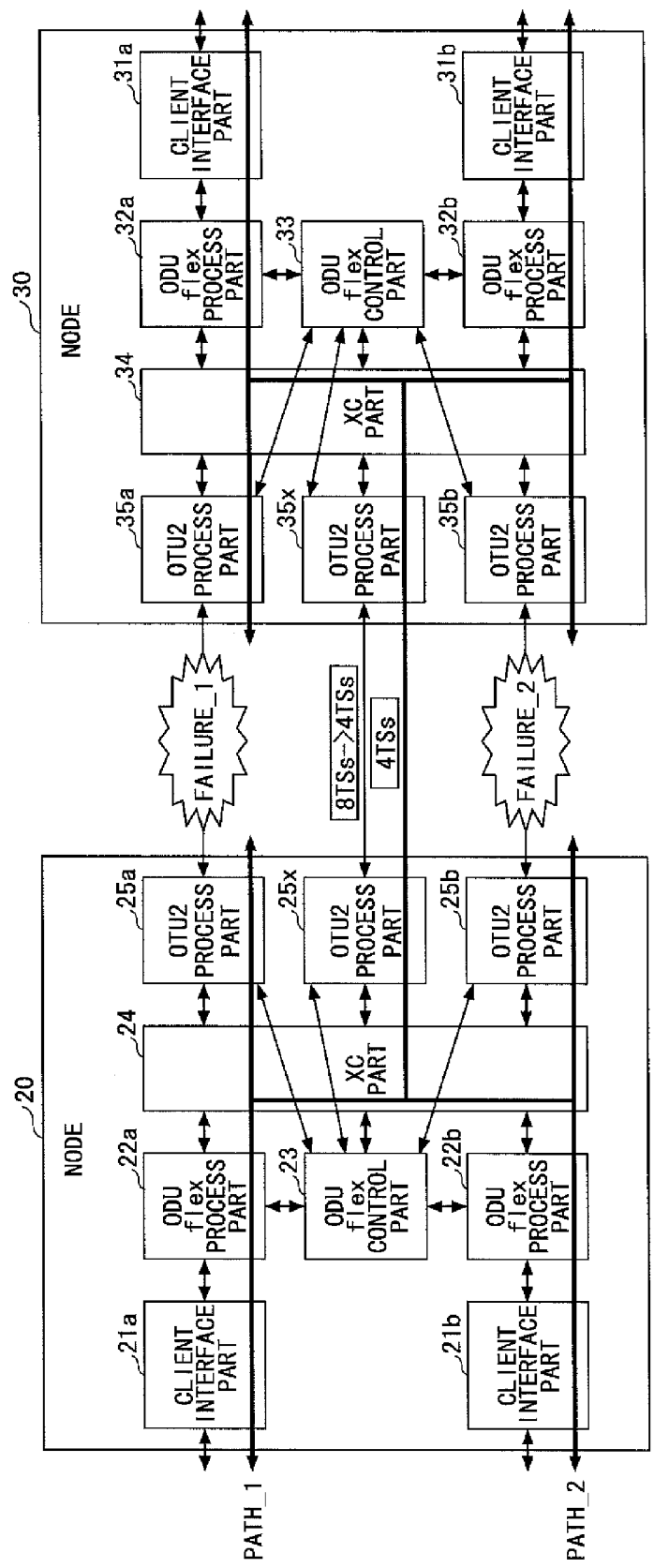
FIG. 6 is diagram for explaining an operation when a double line failure occurs in the first embodiment.

Next, as depicted in FIG. 6, in addition to the FAILURE_1 of the PATH_1, another FAILURE_2 occurs on the PATH_2. The OTU2 process part 35b of the node 30 at the receiver side detects the LOS of the PATH_2, and the ODUflex control part 33 of the node 30 collects the alarm information. The ODUflex control part 33 of the node 30 sends the alarm information by the overhead of the OTU2 frame from the OTU2 process part 35b to the node 20.

Each of the ODUflex control parts 23 and 33 determines, by the expression (1), the bandwidth to be used of the shared protection path and the bandwidth to set to the shared protection path from bandwidths of the working paths where the FAILURE_1 and FAILURE_2 occur. Since Ba=8 [TS], Bb=8 [TS], and Bt=16 [TS], Bs=4 TSs is assigned to the shared protection path for each of the PATH_1 and the PATH_2.

The ODUflex control parts 23 and 33 of the nodes 20 and 30 instruct the cross connect (XC) parts 24 and 34 and the ODUflex process parts 22a and 32a of the PATH_1, respectively, to change the bandwidth of the shared protection path of the PATH_1 being operated. For the PATH_1 where the bandwidth is changed, each of the ODUflex parts 22a and 22b selects a transmission packet having a high priority by using a well-known technology based on a class of service of the Ethernet frame, a Media Access Control (MAC) address, a Virtual Local Area Network (VLAN) tag, an Internet Protocol (IP) address, and the like. By using a TS number (=4 TSs) based on the determined bandwidth, the cross connect setting of the ODUflex of the PATH_1 passing the shared protection path, and data are transmitted via the shared protection path.

Moreover, by using the TS number (=4 TSs) based on the determined bandwidth, the ODUflex control part 23 of the node 20 conducts the cross connect setting so as for the ODUflex frame of the PATH_2 to pass the shared protection path, that is, to pass the OTU2 process part 25x. Data are transmitted via the shared protection path. Also, the ODUflex control part 33 of the node 30 conducts the cross connect setting to the cross connect (XC) part 34 to supply 4 TSs of the PATH_2 where the bandwidth is assigned to the shared protection path. Then, the operation starts. By instructions of the ODUflex control parts 23 and 33, a switch process is performed to switch the TS number of the PATH_1 from 8 TSs to 4 TSs by using a Link Connection Resize (LCR) protocol and a Band Width connection Resize (BWR) protocol. The LCR is transmitted by an OPU overhead of a High Order OPUk (HO_OPUk), and the BWR is transmitted by an OPUflex overhead and the OPU overhead of the HO_OPUks. Also, the switch process is performed by using the LCR protocol and the BWR protocol between the ODUflex process parts 22b and 32b to switch the TS number of the PATH_1 from 8 TSs to 4 TSs.

<Flowchart in First Embodiment>

Figure 7:
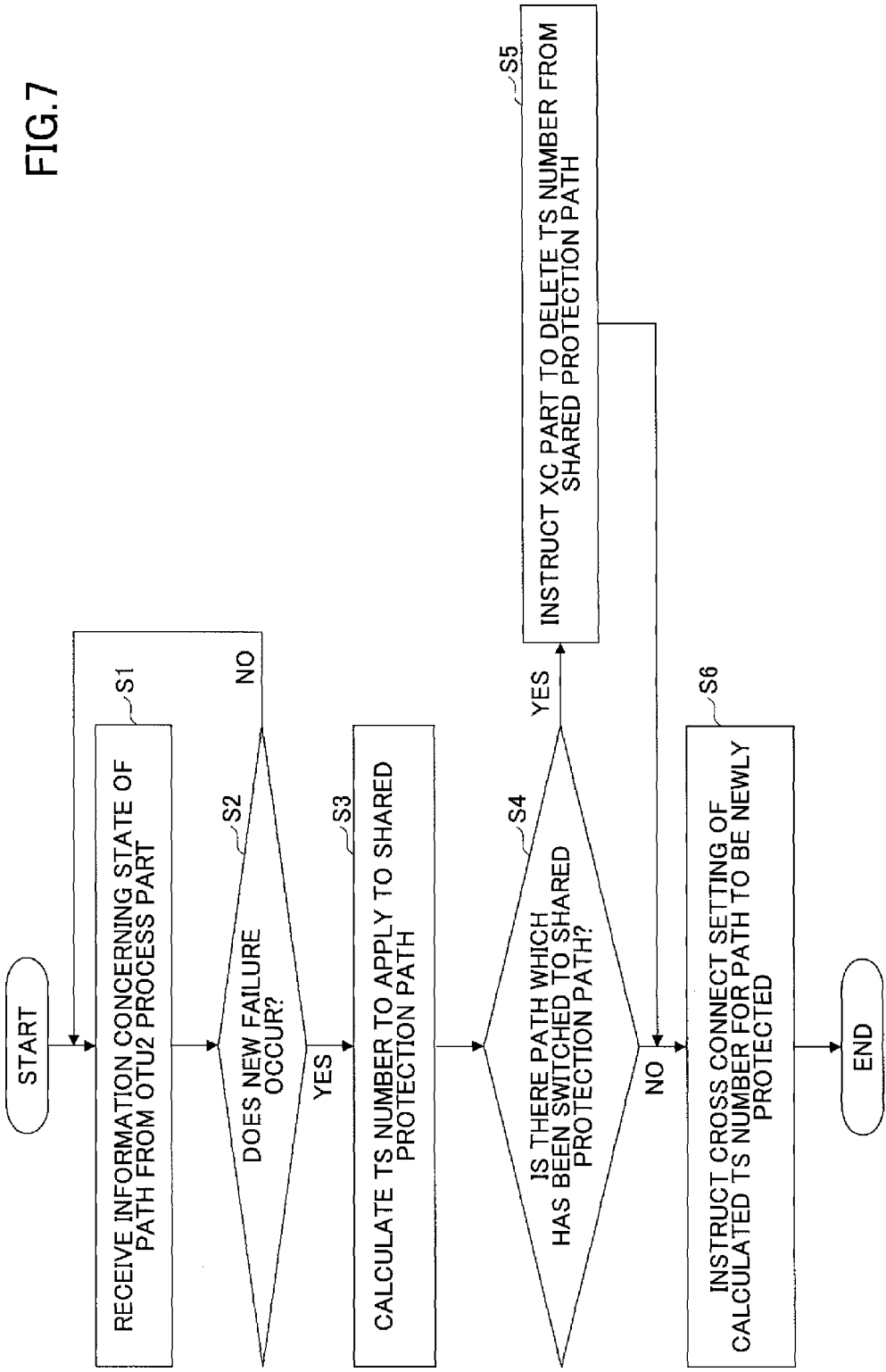
FIG. 7 is a flowchart for explaining a process executed by ODUflex control parts in the first embodiment.

FIG. 7 is a flowchart for explaining a process executed by the ODUflex control parts 23 and 33 in the first embodiment. In FIG. 7, in step S1, the ODUflex control part 23 receives information pertinent to each state of paths of the working path from the OTU2 process parts 25a, 25b, and 25x, and the OTU2 process parts 35a, 35b, and 35x.

In step S2, it is determined whether a new failure occurs. If the new failure does not occur, the ODUflex control part 23 goes back to step S1. If the new failure occurs, in step S3, the ODUflex control part 23 calculates the TS number for each path to assign to the shared protection path by the expression (1). In step S4, the ODUflex control part 23 determines whether there is a path which has been switched to the shared protection path.

In a case in which there is the path which has been switched to the shared protection path, in step S5, the ODUflex control part 23 instructs the cross connect (XC) part 24 to delete the TS number, which is demanded to delete, from the shared protection path, and advances to step S6. If there is no path which has been switched to the shared protection path, the ODUflex control part 23 advances to step S6 without deleting the TS number.

In step S6, the ODUflex control parts 23 and 33 instruct the cross connect (XC) parts 24 and 34 to conduct the cross connect setting for switching to the shared protection paths only by the TS number calculated in step S3, respectively, for the path protected since the new failure occurs. This process is terminated. However, if the TS number of the path to protect is demanded to be switched, the ODUflex control parts 23 and 33 instruct the ODUflex process parts 22a and 22b of the node 20 and the ODUflex process parts 32a and 32b of the node 30, respectively, to conduct the path resizing process for changing the TS number of the path to protect, by using the LCR protocol and the BWR protocol. After that, the ODUflex control parts 23 and 33 go back to step S1.

When the FAILURE_2 of the PATH_2 is recovered, the ODUflex control parts 23 and 33 determine the bandwidth to set to the shared protection path to switch the PATH_2 from the shared protection path to which the PATH_2 is assigned to, to the working path. Thus, Bs=8 TSs of the PATH_1 is assigned to the shared protection path.

After that, the ODUflex control parts 23 and 33 of the nodes 20 and 30 switch the PATH_2 of 4 TSs from the shared protection path to the working path to be 8 TSs, and instruct the cross connect (XC) parts 24 and 34 and the ODUflex parts 22a, 22b, 32a, and 32b of the PATH_1 and the PATH_2 to change the bandwidth of the shared protection path of the PATH_1 to 8 TSs. Then, by instructions of the ODUflex control parts 23 and 33, the path resizing process is conducted to change the TS number of the PATH_1 from 4 TSs to 8 TSs by using the LCR protocol and the BWR protocol between the ODUflex process parts 22a and 32a. Also, the path resizing process is conducted to change the TS numbers of the PATH_1 and the PATH_2 from 4 TSs to 8 TSs by using the LCR protocol and the BWR protocol between the ODUflex process parts 22b and 32b.

<OTN Transmission System in Second Embodiment>

Figure 8:
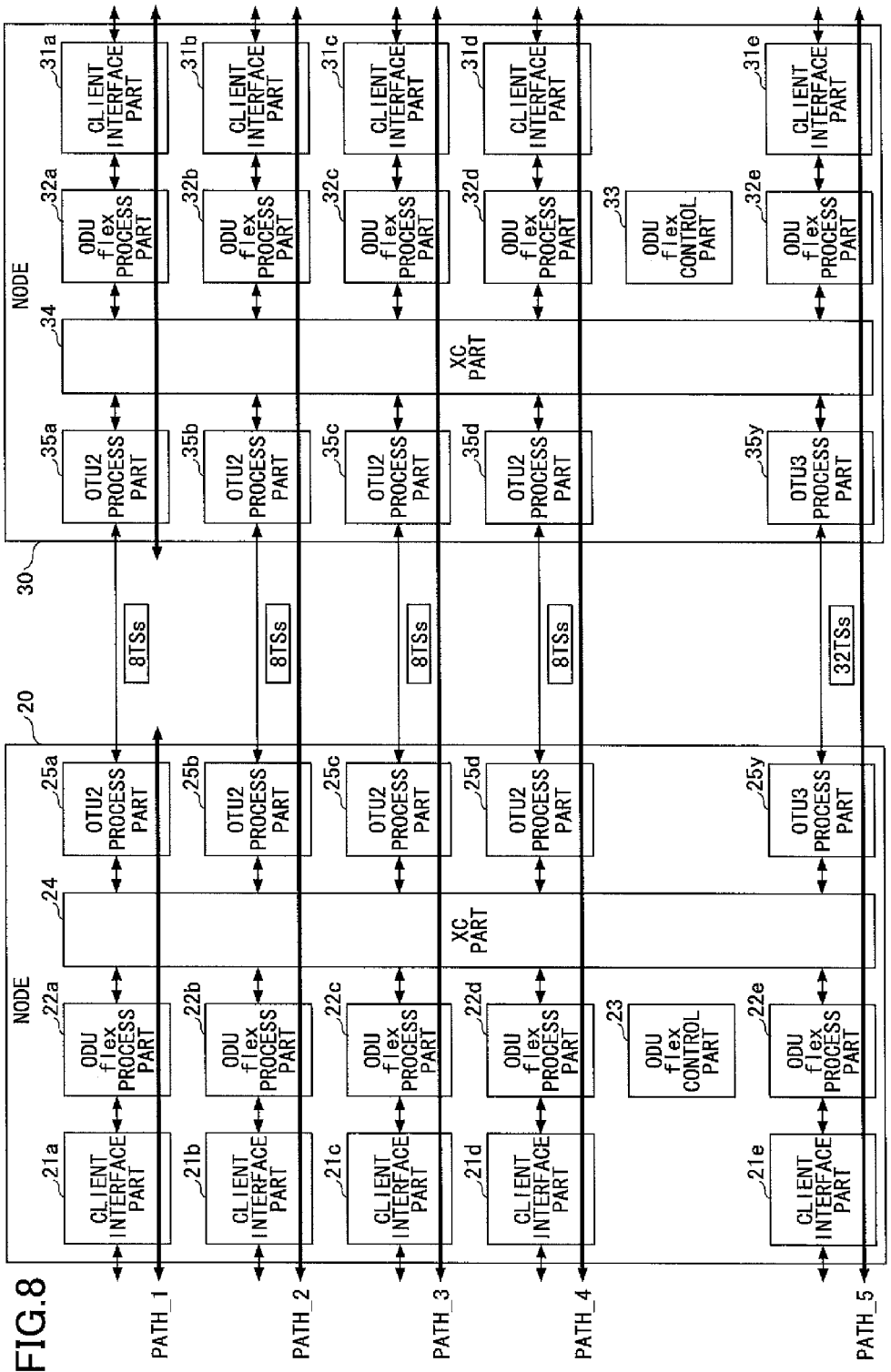
FIG. 8 is a diagram illustrating a configuration of an OTN system in a second embodiment.

FIG. 8 is a diagram illustrating a configuration of an OTN system in a second embodiment. In FIG. 8, at the node 20, the Ethernet frame supplied from the client is received by client interface parts 21a, 21b, 21c, 21d, and 21e, and is supplied to ODUflex process parts 22a, 22b, 22c, 22d, and 22e. The ODUflex process parts 22a through 22e map the Ethernet frame into the ODUflex which is the accommodation format at the LO side of the OTN.

In a case of mapping into the ODUflex, the ODUflex control part 23 coordinates with each of the ODUflex process parts 22a through 22e, the cross connect (XC) part 24, OTU2 process parts 25a through 25d being interfaces at the network side, and an OTU3 process part 25y, and acquires the bandwidth to be used and the line state pertinent to each of paths. Also, the bandwidth of the ODUflex for the protection to assign is determined. After that, the ODUflex control part 23 instructs the cross connect (XC) part 24 to conduct the actual cross connect setting.

The ODUflex frame from the ODUflex process parts 22a through 22d is supplied to the OTU2 process parts 25a through 25d at the HO side through the cross connect (XC) part 24, and is mapped into the ODU2. Moreover, the overhead such as the FEC information or the like is added to the ODUflex frame. The ODUflex frame is transmitted as the OTU2 frame to OTU2 process parts 35a through 35d of the node 30 being the opposite node.

Also, the ODUflex frame supplied to the OTU3 process part 25y is mapped to an ODU3. Moreover, the overhead such as the FEC information or the like is added to the ODUflex frame. The ODUflex frame is transmitted as an OTU3 frame to an OTU3 process part 35y of the node 30 being the opposite node.

At the node 30, by the OTU2 process parts 35a through 35d, and the OTU3 process part 35y, the OTU2 frame or an OTU3 signal transmitted through the network is received and the ODU2 or the ODU3 are extracted. Moreover, the ODUflex frame is demapped from the ODU2 or the ODU3. The ODUflex frame, which is output from the OTU2 process parts 35a through 35d and the OTU3 process part 35y, is supplied to the ODUflex process parts 32a through 32e through the cross connect (XC) part 34 by the cross connect setting of the ODUflex control part 33.

Each of the ODUflex process parts 32a through 32e demaps from the ODUflex frame to the Ethernet frame. The Ethernet frame is supplied from client interface parts 31a through 31e to the client. The transmission from the node 20 to the node 30 is described above. The transmission from the node 30 to the node 20 is conducted in the same manner.

A PATH_1 is bi-directional to connect between the OTU2 process parts 25a and 35a. A PATH_2 is bi-directional to connect between the OTU2 process parts 25b and 35b. A PATH_3 is bi-directional to connect between the OTU2 process parts 25c and 35c. A PATH_4 is bi-directional to connect between the OTU2 process parts 25d and 35d. Each of the PATH_1 through PATH_4 is the working path of 8 TSs, that is, 10 Gbps. A PATH_5 is bi-directional to connect between the OTU3 process parts 25y and 35y, and is a shared path for the working path of 32 TSs, that is, 40 Gbps and the shared protection path. Hereinafter, the PATH_5 is called "shared PATH_5".

The priorities of the PATH_1 through the PATH_4 are higher than that of the shared PATH_5. The priorities of the PATH_1 through the shared PATH_5 are stored beforehand in the memories 23b and 33b in the ODUflex control parts 23 and 33.

<Line Failure Occurrence>

Figure 9:
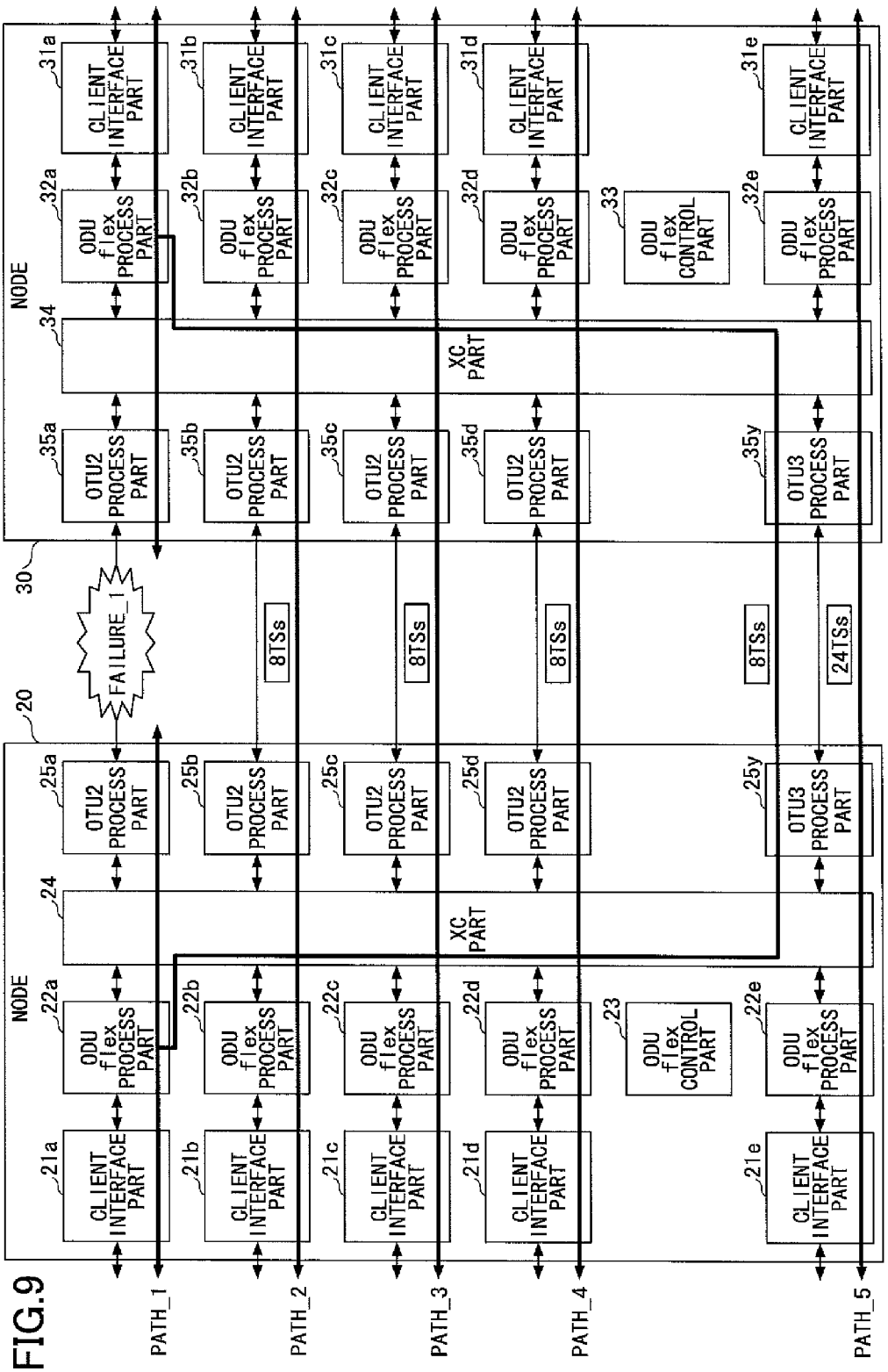
FIG. 9 is a diagram for explaining an operation when a line failure occurs in the second embodiment.

As described in FIG. 9, the FAILURE_1 (line failure) occurs on the PATH_1 between the OTU2 process parts 25a and 35a. In this case, similar to the first embodiment, when recognizing the failure state of the PATH_1 of 8 TSs, the ODUflex control parts 23 and 33 of the node 20 and the node 30 determine the bandwidth to assign to the shared protection path of the shared PATH_5, from the bandwidth of the working path where the FAILURE_1 occurs. The ODUflex control parts 23 and 33 decrease the bandwidth of the shared PATH_5 having a lower priority than the PATH_1 from 32 TSs to 24 TSs, and instructs the cross connect (XC) parts 24 and 34 to conduct the cross connect setting, in order for a path of 8 TSs for protecting the PATH_1 to pass the shared protection path of the shared PATH_5. By the cross setting, the PATH_1 is protected by the shared protection path. When the PATH_1 is protected, operations of the working paths on the PATH_2 through the PATH_4 are not influenced. In this case, by the instructions of the ODUflex control parts 23 and 33, the path resizing process is conducted to change the bandwidth of the shared PATH_5 from 32 TSs to 24 TSs by using the LCR protocol and the BWR protocol between the ODUflex process parts 22a and 32a and between the ODUflex process parts 22e and 32e.

Figure 10:
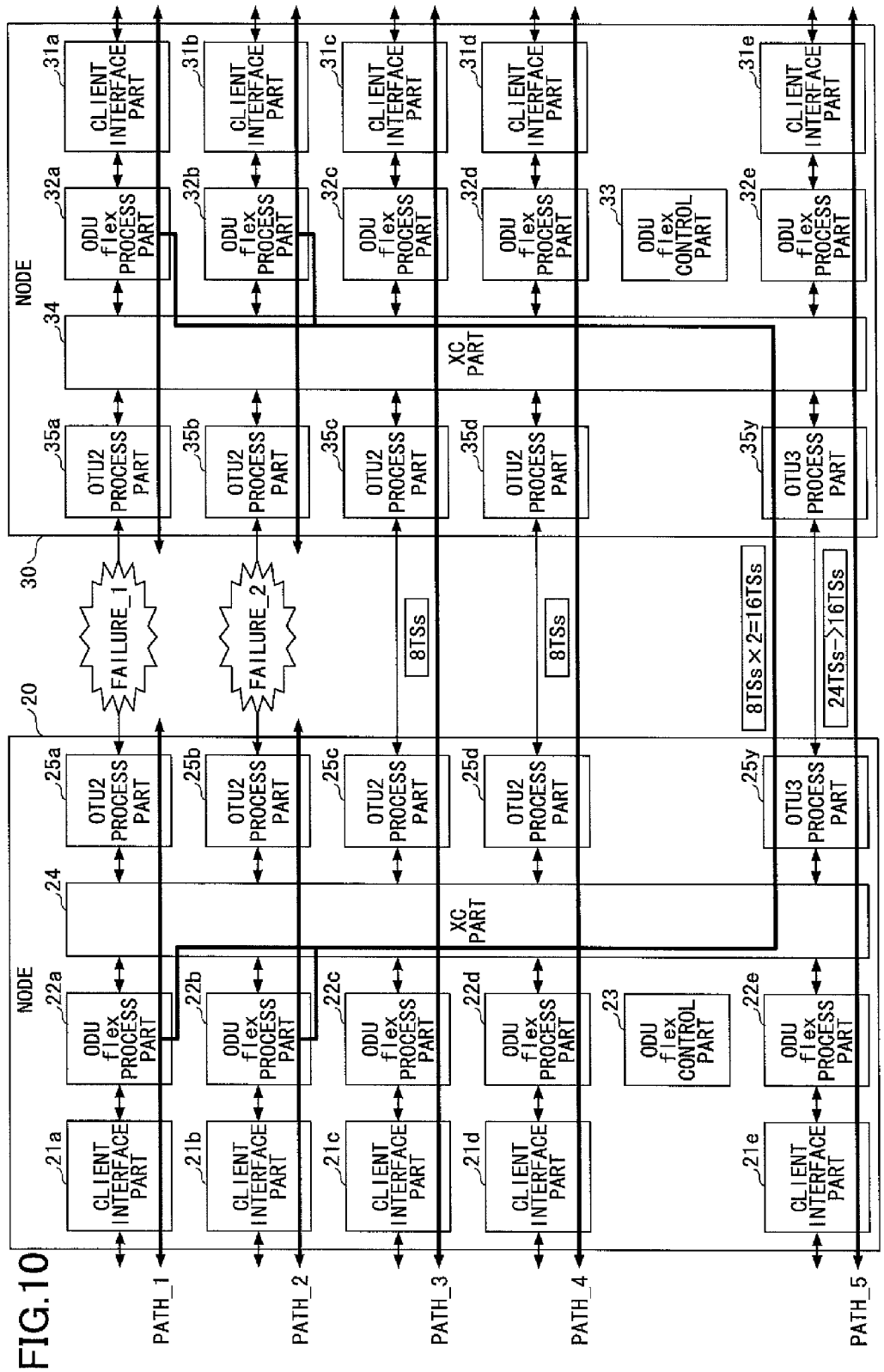
FIG. 10 is a diagram for explaining an operation when a double line failure occurs in the second embodiment.

Next, as illustrated in FIG. 10, the FAILURE_2 (line failure) occurs on the PATH_2 between the OTU2 process parts 25b and 35b, and the failure state is recognized. The ODUflex control parts 23 and 33 decrease the bandwidth of the shared PATH_5 having the lower priority than the PATH_2, and perform the cross connect setting with respect to the cross connect (XC) parts 24 and 34 in order for the path of 8 TSs to protect the PATH_2 to pass the shared protection path of the shared PATH_5. When the cross connect setting is conducted, operations of the working path for the PATH_3 and the PATH_4 are not influenced. In this case, by the instructions of the ODUflex control parts 23 and 33, the path resizing process is conducted to change the bandwidth of the shared PATH_5 from 24 TSs to 16 TSs by using the LCR protocol and the BWR protocol between the ODUflex process parts 22a and 32a and between the ODUflex process parts 22e and 32e.

Figure 11:
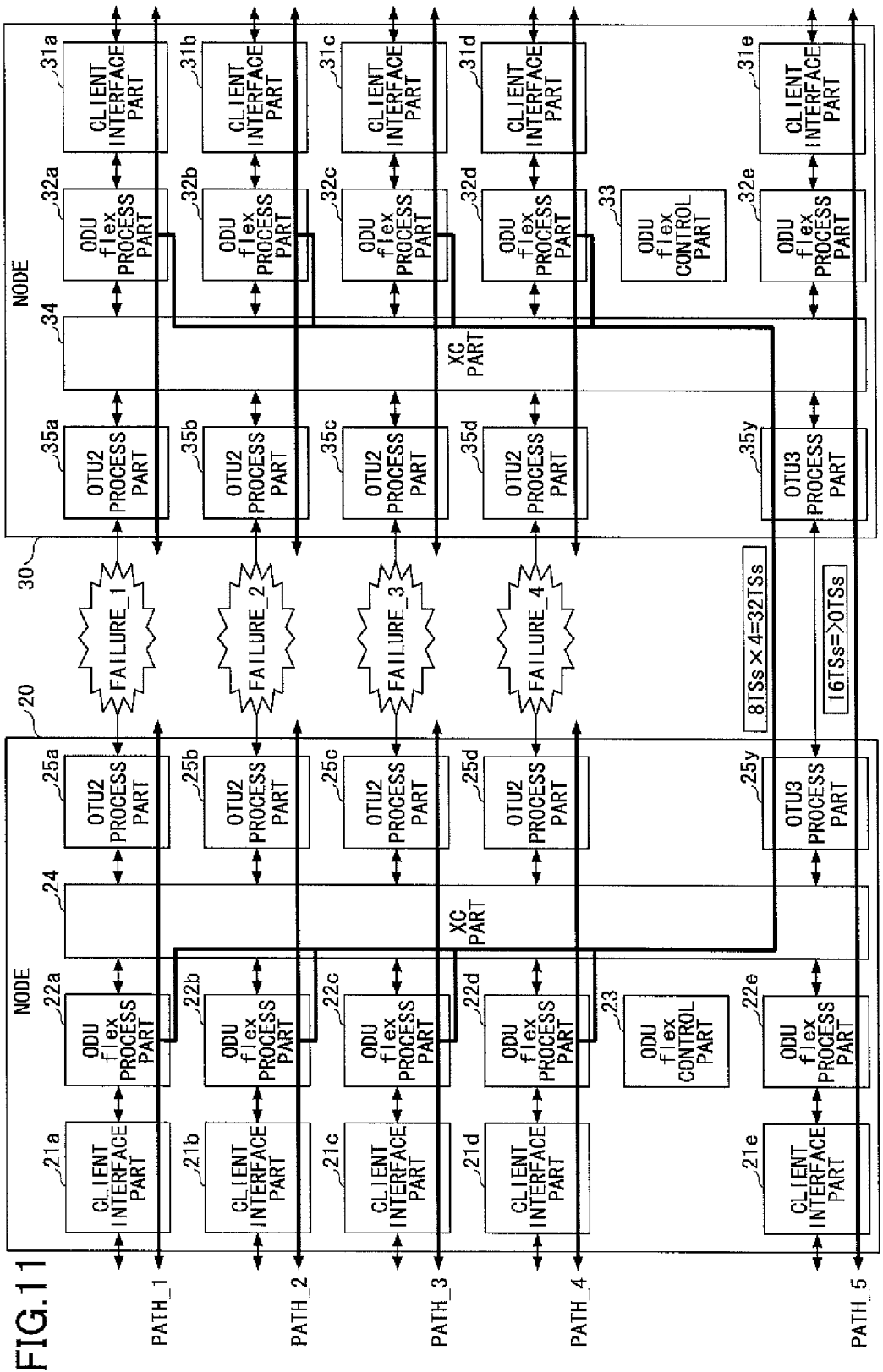
FIG. 11 is a diagram for explaining an operation when a quadruple line failure occurs in the second embodiment.

Furthermore, as illustrated in FIG. 11, a FAILURE_3 and a FAILURE_4 (line failures) occur on the PATH_3 and the PATH_4 between the OTU2 process parts 25c and 35c and between the OTU2 process parts 25d and 35d, and the failure state is recognized. The ODUflex control parts 23 and 33 decrease the bandwidth of the shared PATH_5 having the lower priority than the PATH_3 and the PATH_4, and instruct the cross connect setting to the cross connect (XC) parts 24 and 34 in order for paths of 8 TSs each for protecting the PATH_3 and the PATH_4 to pass the shared protection path of the shared PATH_5. When the cross connect setting is conducted, transmission of the working path of the PATH_5 cannot be performed.

<Flowchart in Second Embodiment>

Figure 12:
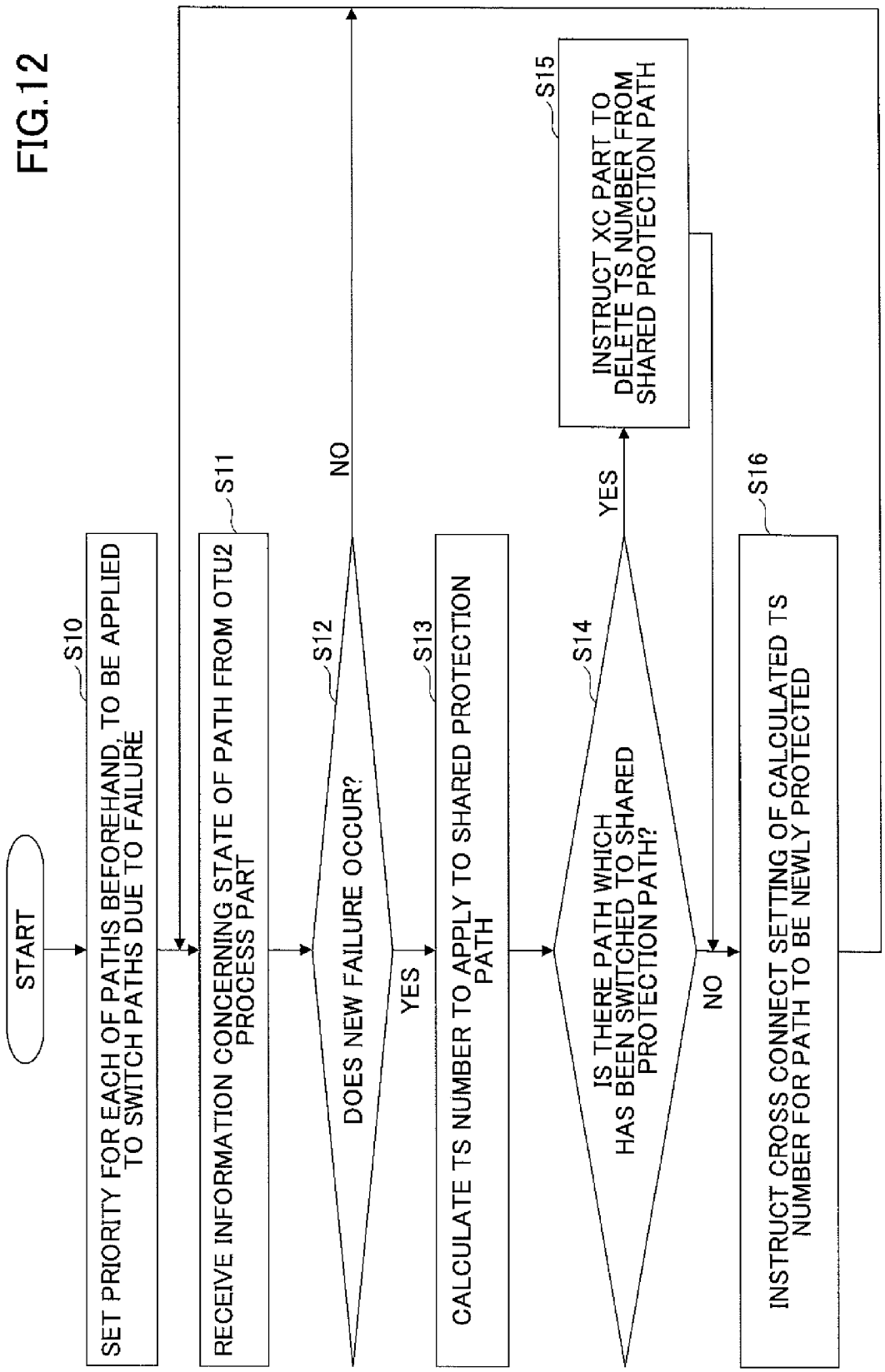
FIG. 12 is a flowchart for explaining a process executed by ODUflex control parts in the second embodiment.

FIG. 12 is a flowchart for explaining a process executed by the ODUflex control parts 23 and 33 in the second embodiment. In FIG. 12, in step S10, the priority is set for each path to use to switch for the failure. In step S11, the ODUflex control part 23 receives information pertinent to each state of the paths of the working paths from the OTU2 process parts 25a through 25d.

In step S12, the ODUflex control part 23 determines whether a new failure occurs. If no new failure occurs, the ODUflex control part 23 goes back to step S11. When the new failure occurs, in step S13, the ODUflex control part 23 deletes the bandwidth of a shared path having the lower priority than other paths where the failures occur, and calculates the TS number for each of the paths to assign to the shared protection path of the shared path by the expression (1). The bandwidth of the shared path is used as all bandwidths Ba [TS] for the shared protection path.

In step S14, the ODUflex control part 23 determines whether there is a path which has been switched to the shared protection path.

In a case in which there is the path which has been switched, in step S15, the ODUflex control part 23 instructs the cross connect (XC) part 24 to delete the TS number from the shared protection path of the shared path having the lower priority than other paths where the failures occur. Then, the ODUflex control part 23 advances to step S16. If there is no path which has been switched, the ODUflex control part 23 advances to step S16 without deleting the TS number.

In step S16, the ODUflex control parts 23 and 33 instructs the cross connect (XC) parts 24 and 34 to conduct the cross connect setting in order to switch to the shared protection path only by the TS number calculated in step S13 for the path to protect due to the new failure. Also, if the TS number of the path to protect is switched, the ODUflex control parts 23 and 33 of the node 20 and the node 30 instruct the ODUflex process parts 22a to 22e and 32a to 32e to switch the TS number of the path to protect by using the LCR protocol and the BWR protocol. After that, this process advances to step S11.

<OTN Transmission System in Third Embodiment>

Figure 13:
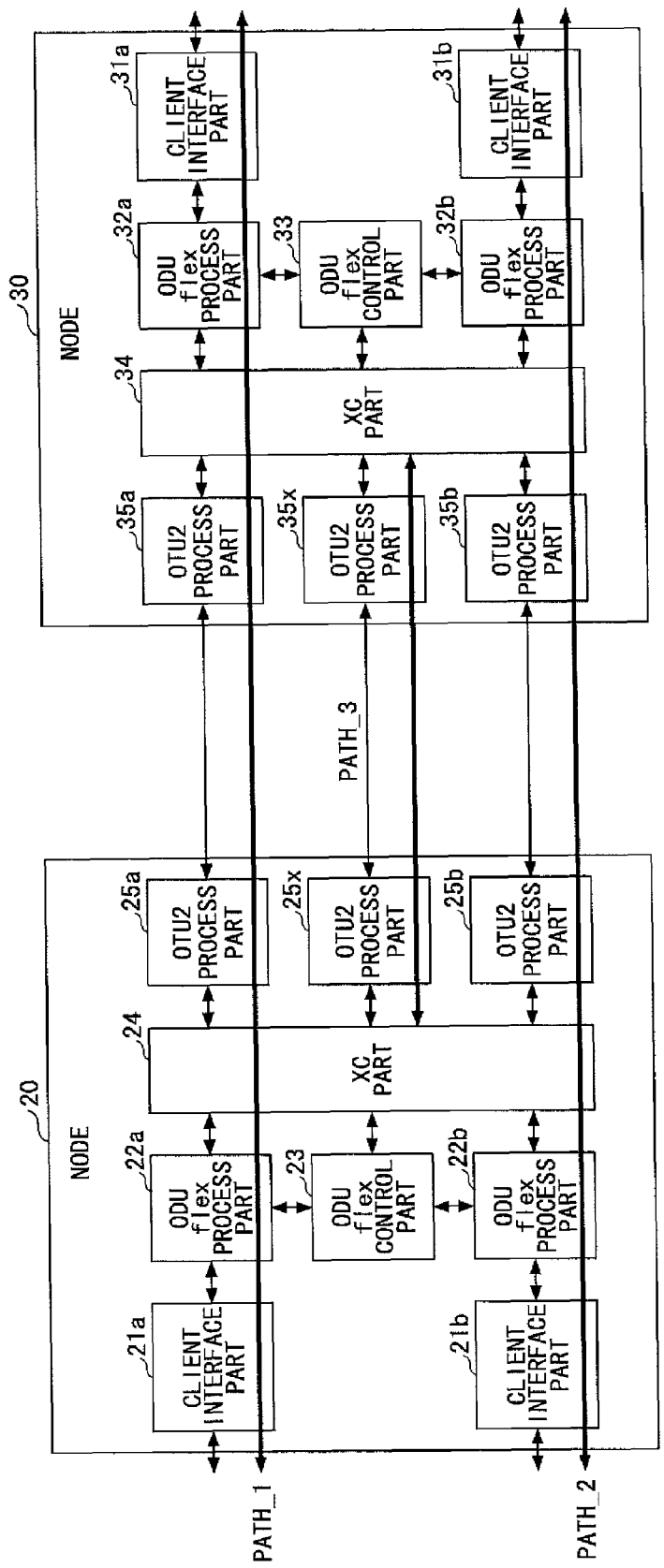
FIG. 13 is a diagram illustrating a configuration of an OTN transmission system in a third embodiment.

FIG. 13 is a diagram illustrating a configuration of an OTN transmission system in a third embodiment. In FIG. 13, parts that are the same as those in FIG. 3 are indicated by the same reference numerals and the explanation thereof will be omitted.

In FIG. 13, the PATH_1 is bi-directional, and connects between the OTU2 process parts 25a and 35a to transmit the OTU2 frame. The PATH_2 is bi-directional, and connects between the OTU2 process parts 25b and 35b to transmit the OTU2 frame. Each of the PATH_1 and the PATH_2 is the working path of 8 TSs, that is, 10 Gbps. Also, the shared protection path of 8 TSs, that is, 10 Gbps is provided between the OTU2 process parts 25x and 35x. However, for the shared protection path, the cross connect setting of the ODUflex supporting the Ethernet frame is not conducted beforehand.

Also, the ratios of the PATH_1 and the PATH_2 to protect is set and stored beforehand in the memories 23b and 33b internally implemented in the ODUflex control parts 23 and 33, respectively. In the third embodiment, the PATH_1 and the PATH_2 are to be protected when the FAILURE_1 or the FAILURE_2 occur. The ratio of the PATH_1 is set as 75% and the ratio of the PATH_2 is set as 25%.

Figure 14:
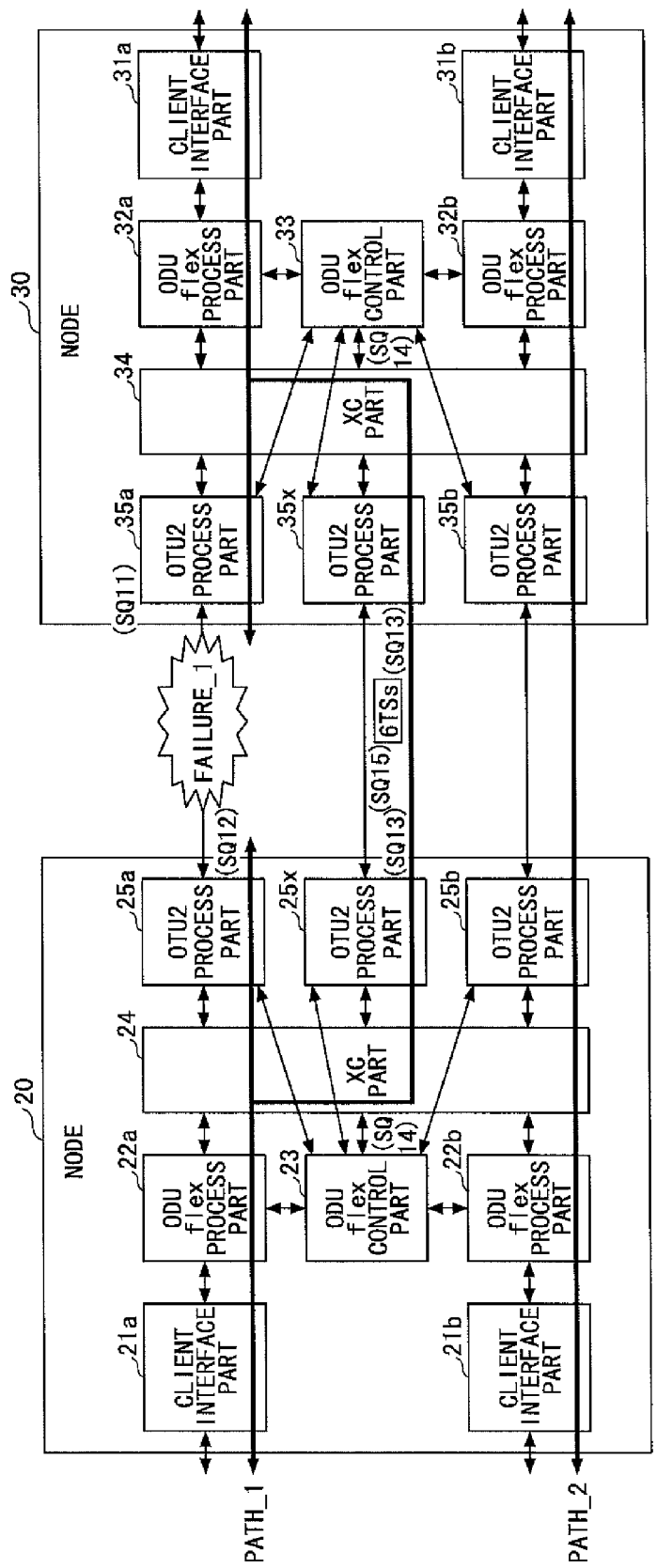
FIG. 14 is a diagram for explaining an operation when a line failure occurs in the third embodiment.

As illustrated in FIG. 14, the FAILURE_1 (line failure) occurs between the OTU2 process part 25a and 35a. Sequence numbers are also indicated with parentheses in FIG. 14.

Sequence (SQ11): At the receiver side, the OTU2 process part 35a of the node 30 detects the LOS of the PATH_1, and the ODUflex control part 33 of the node 30 collects the alarm information. Then, the ODUflex control part 33 of the node 30 sends the alarm information by using the overhead of the OTU2 frame from the OTU2 process part 35a to the node 20 being the opposite node.

Sequence (SQ12): The OTU2 process part 25a of the node 20 detects the alarm information from the overhead of the OTU2 frame, and reports the failure state of the line to the ODUflex control part 23.

Sequence (SQ13): The ODUflex control parts 23 and 33 of the nodes 20 and 30 confirm that no failure occurs on the shared protection path.

Sequence (SQ14): Since the ratio of the PATH_1 set in the memory 23b indicates 75%, the ODUflex control part 23 of the node 20 assigns the bandwidth of the shared protection path, that is, 6 TSs corresponding to 75% of 8 TSs to the PATH_1, conducts the cross connect setting so that the ODUflex frame of the 6 TSs of the PATH_1 passes the shared protection path, and sends data through the shared protection path.

Sequence (SQ15): The ODUflex control part 33 of the node 30 instructs the cross connect setting to the cross connect (XC) part 34 so that the shared protection path of 6 TSs of the PATH_1 is supplied from the shared protection path. The operation starts. Then, by the instruction of the ODUflex control parts 23 and 33, the switching process is conducted to switch the TS number of the PATH_1 from 8 TSs to 6 TSs by using the LCR protocol and the BWR protocol between the ODUflex process parts 22a and 32a.

Figure 15:
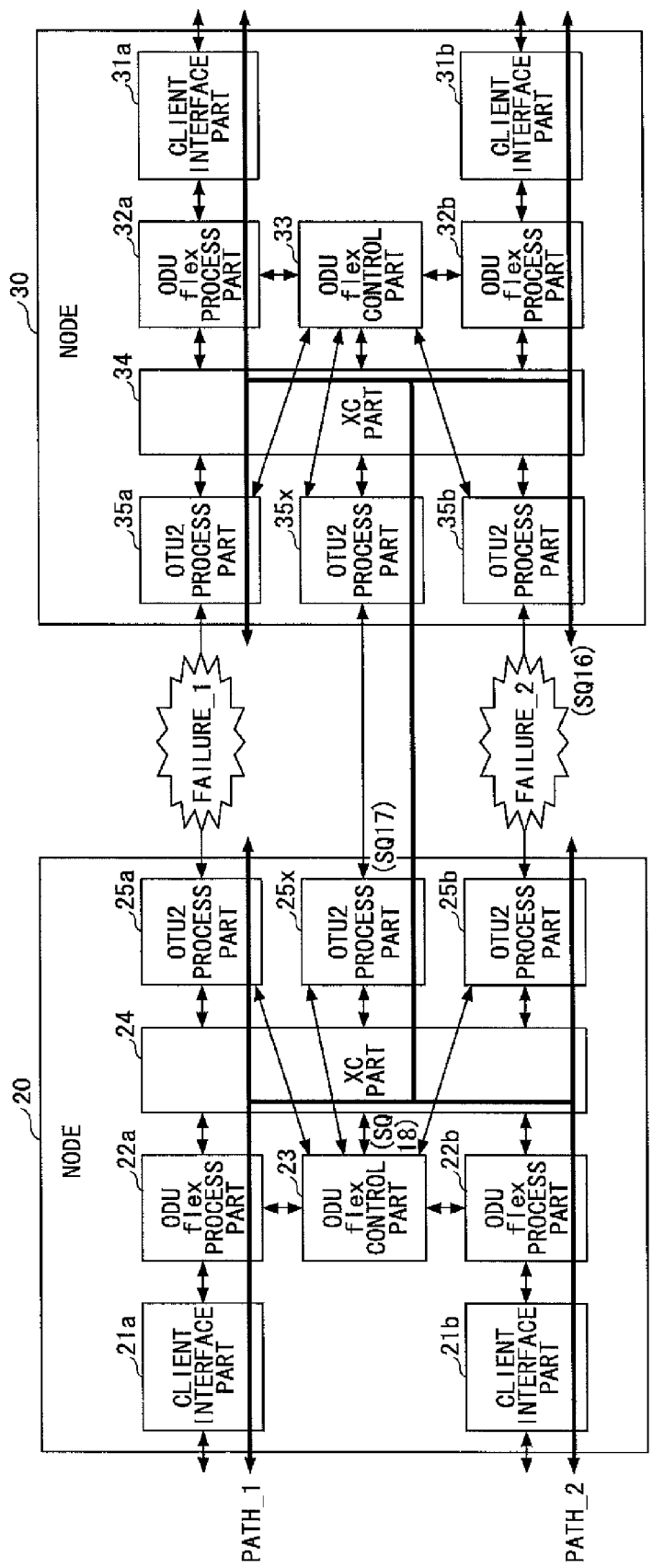
FIG. 15 is a diagram for explaining an operation when a double line failure occurs in the third embodiment.

Next, as illustrated in FIG. 15, in addition to the FAILURE_1 of the PATH_1, the FAILURE_2 occurs on the PATH_2. Sequence numbers are also indicated with parentheses in FIG. 15.

Sequence (SQ16): At the receiver side, the OTU2 process part 35b of the node 30 detects the LOS of the PATH_2, the ODUflex control part 33 of the node 30 collects the alarm information. The ODUflex control part 33 of the node 30 sends the alarm information by using the overhead of the OTU2 frame from the OTU2 process part 35b to the node 20 being the opposite node.

Sequence (SQ17): The ODUflex control parts 23 and 33 of the nodes 20 and 30 confirm that the failure does not occur on the shared protection path.

Sequence (SQ18): Since the ratio of the PATH_2 set in the memory 23b indicates 25%, the ODUflex control part 23 of the node 20 assigns the bandwidth of the shared protection path, that is, 2 TSs corresponding to 25% of 8 TSs, and conducts the cross connect setting so that the ODUflex frame of 2 TSs of the PATH_2 passes the shared protection path. Data are sent through the shared protection path.

The ODUflex control part 33 of the node 30 instructs the cross connect setting to the cross connect (XC) part 34 so as to supply the shared protection path of 2 TSs of the PATH_2 from the shared protection path to the ODUflex process part 22b. The operation starts. After that, by the instructions of the ODUflex control parts 23 and 33, the path resizing process is conducted to change the TS number of the PATH_2 from 8 TSs to 2 TSs by using the LCR protocol and the BWR protocol between the ODUflex process parts 22b and 32b.

A flowchart for the process executed by the ODUflex control parts 23 and 33 in the third embodiment is similar to that illustrated in FIG. 12. However, the ratios of the PATH_1 and the PATH_2 to protect from the FAILURE_1 and FAILURE_2 in step S10 are set. In step S13, the TS number for each of the FAILURE_1 and FAILURE_2 is calculated based on the ratios of the PATH_1 and the PATH_2, respectively.

<OTN Transmission System in Fourth Embodiment>

Figure 16:
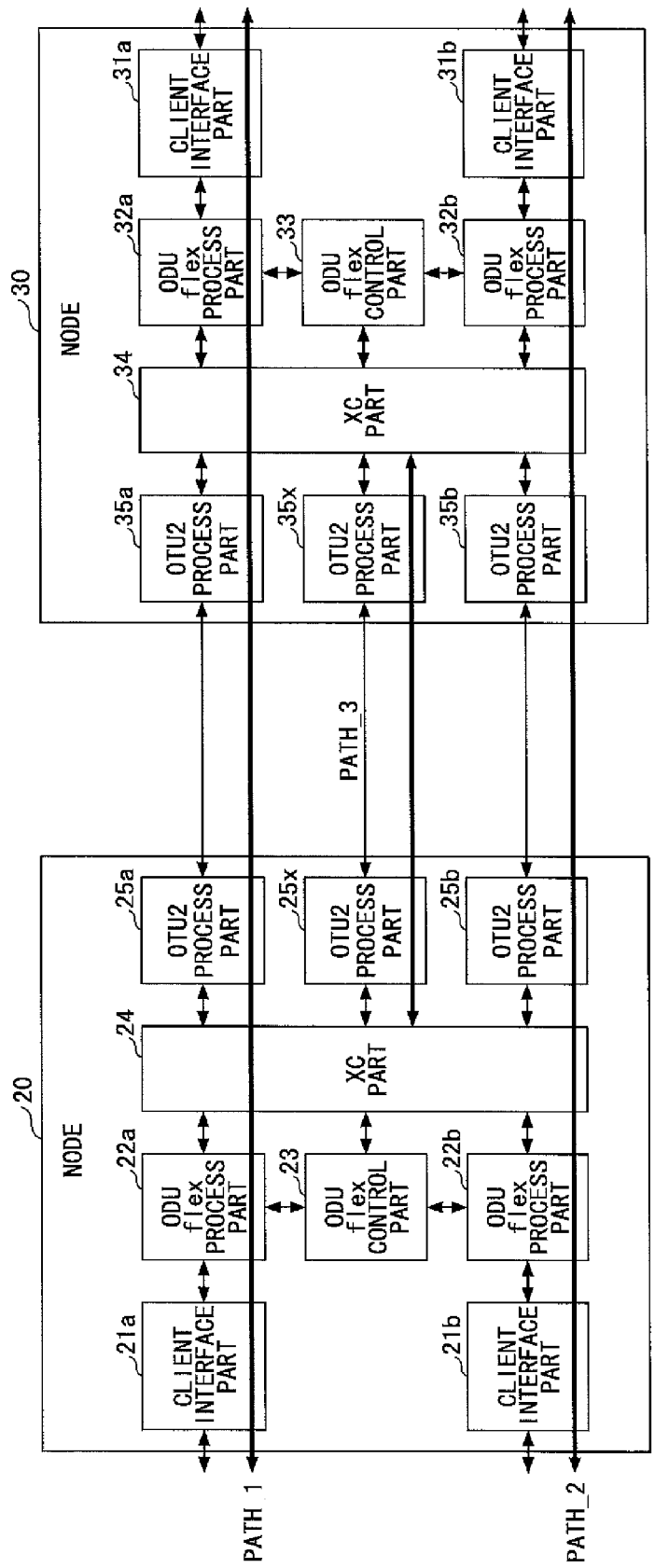
FIG. 16 is a diagram illustrating a configuration of an OTN transmission system in a fourth embodiment.

FIG. 16 is a diagram illustrating a configuration of an OTN transmission system in a fourth embodiment. In FIG. 16, parts that are the same as those in FIG. 13 are indicated by the same reference numerals and the explanation thereof will be omitted.

In FIG. 16, the PATH_1 is bi-directional, connects between the OTU2 process parts 25a and 35a, and transmits the OTU2 frame. The PATH_2 is bi-direction, connects between the OTU2 process parts 25b and 35b, and transmits the OTU2 frame. The PATH_1 and the PATH_2 are the working paths of 8 TSs, that is, 10 Gbps. Also, the shared protection path being bi-directional of 8 TSs, that is, 10 Gbps is provided between the OTU2 process parts 25x and 35x. That is, for the shared protection path, the cross connect setting of the ODUflex supporting the Ethernet frame is not conducted beforehand.

Figure 17:
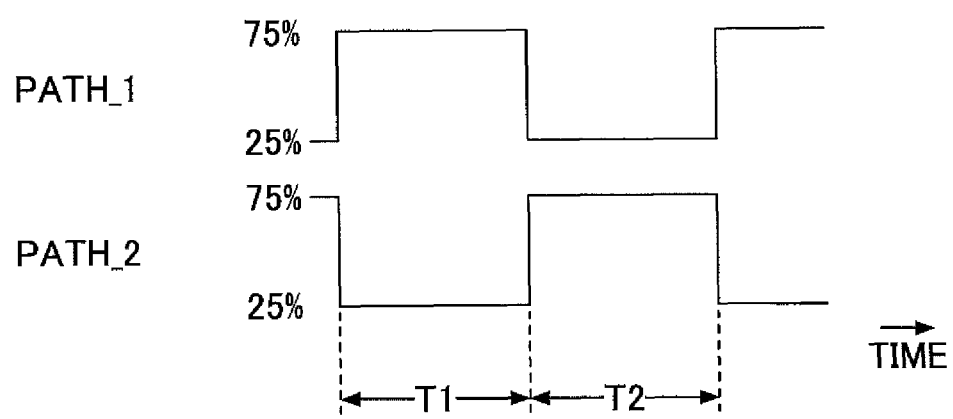
FIG. 17 is a diagram illustrating ratio examples of PATH_1 to PATH_2 which are to be protected when failures occur.

Also, the ratios of the PATH_1 and the PATH_2 to protect is set and stored beforehand in the memories 23b and 33b internally implemented in the ODUflex control parts 23 and 33, respectively so that the ratios are changed depending on passage of time. In the fourth embodiment, as illustrated in FIG. 17, regarding the ratios of the PATH_1 and the PATH_2 to protect in a case in that the FAILURE_1 and the FAILURE_2 occur, in a term T1, 75% is set for the PATH_1 and 25% is set for the PATH_2. In a term T2, 25% is set for the PATH_1, and 75% is set for the PATH_2. The term T1 and the term T2 are alternately repeated.

Figure 18:
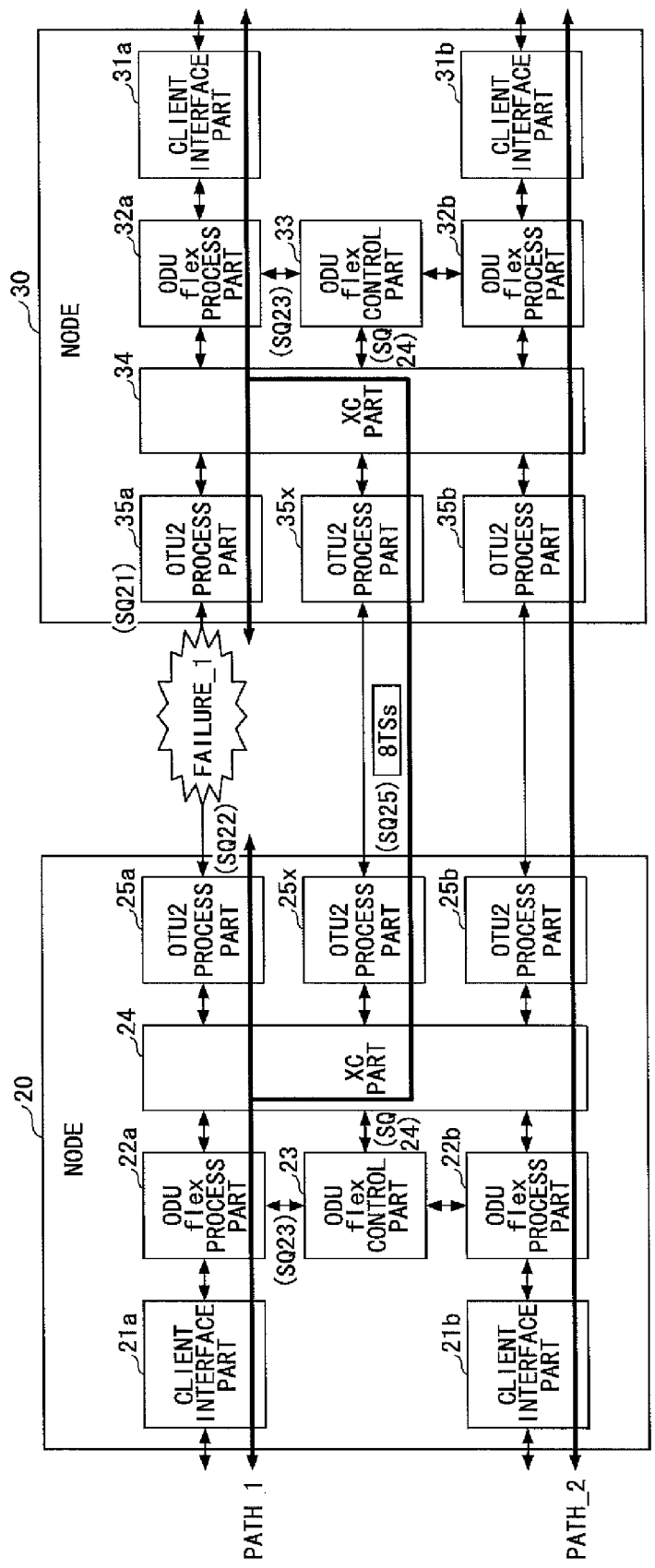
FIG. 18 is a diagram for explaining an operation when a line failure occurs in the fourth embodiment.

As illustrated in FIG. 18, the FAILURE_1 occurs between the OTU2 process parts 25a and 35a. Sequence numbers are also indicated with parentheses in FIG. 18.

Sequence (SQ21): At the receiver side, the OTU2 process part 35a of the node 30 detects the LOS of the PATH_1, and the ODUflex control part 33 of the node 30 collects the alarm information. Then, the ODUflex control part 33 of the node 30 sends the alarm information by using the overhead of the OTU2 frame from the OTU2 process part 35a to the node 20 being the opposite node.

Sequence (SQ22): The OTU2 process part 25a of the node 20 detects the alarm information from the overhead of the OTU2 frame, and reports the failure state of the working path to the ODUflex control part 23.

Sequence (SQ23): The OTU2 flex control parts 23 and 33 of the nodes 20 and 30 confirm that no failure occurs on the shared protection path.

Sequence (SQ24): Since the ratio of the PATH_1 in the term T1 set in the memory 23b, the ODUflex control part 23 of the node 20 assigns the bandwidth of the shared protection path, that is, 6 TSs corresponding to 75% of 8 TSs, conducts the cross connect setting so as to pass the ODUflex frame of 6 TSs of the PATH_1, and transmits data via the shared protection path.

Sequence (SQ25): The ODUflex control part 33 of the node 30 instructs the cross connect setting to the cross connect (XC) part 34 so as to supply the shared protection path of 6 TSs of the PATH_1 from the shared protection path to the ODUflex process part 32a. The operation starts. After that, by the instructions of the ODUflex control parts 23 and 33, the path resizing process is conducted to change the TS number of the PATH_1 from 8 TSs to 6 TSs by using the LCR protocol and the BWR protocol between the ODUflex process parts 22a and 32a.

Figure 19:
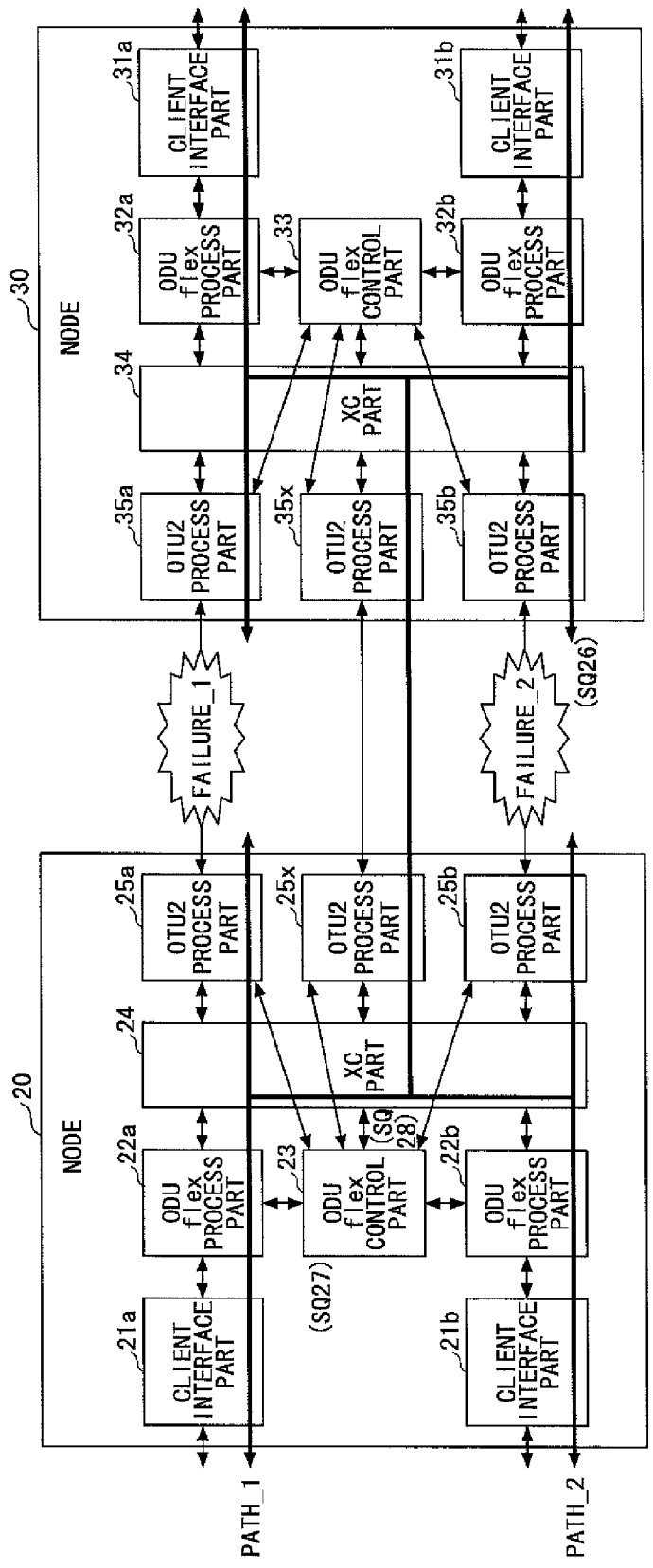
FIG. 19 is a diagram for explaining an operation when a double line failure occurs in the fourth embodiment.

Next, as illustrated in FIG. 19, in addition to the FAILURE_1 of the PATH_1, the FAILURE_2 occurs on the PATH_2. Sequence numbers are also indicated with parentheses in FIG. 19.

Sequence (SQ26): At the receiver side, the OTU2 process part 35b of the node 30 detects the LOS of the PATH_2, and the ODUflex control part 33 of the node 30 collects the alarm information. The ODUflex control part 33 of the node 30 sends the alarm information by the overhead of the OTU2 frame from the OTU2 process part 35b to the node 20 being the opposite node.

Sequence (SQ27): The ODUflex control parts 23 and 33 of the nodes 20 and 30 confirm that no failure occurs on the shared protection path.

Sequence (SQ28): Since the ratio of the PATH_2 set in the memory 23b indicates 25% in the term T1, the ODUflex control part 23 of the node 20 assigns the bandwidth of the shared protection path, that is, 2 TSs corresponding to 25% of 8 TSs, conducts the cross connect setting so that the ODUflex frame of 2 TSs of the PATH_2 passes the shared protection path, and sends data via the shared protection path.

The ODUflex control part 33 of the node 30 instructs the cross connect setting to the cross connect (XC) part 34 so as to supply the shared protection path of 2 TSs of the PATH_2 from the shared protection path to the ODUflex process part 32b. The operation starts. After that, by the instructions of the ODUflex control parts 23 and 33, the path resizing process is conducted to change the TS number of the PATH_2 from 8 TSs to 2 TSs by using the LCR protocol and the BWR protocol between the ODUflex process parts 22b and 32b. A count in the term T1 may start at a point of the sequence (SQ28).

Next, when the term T1 ends and the term T2 starts, the ODUflex control parts 23 and 33 of the nodes 20 and 30 change the bandwidth of the shared protection path of the PATH_1 to 2 TSs, and instructs the cross connect (XC) parts 24 and 34 and the ODUflex parts 22a, 32a, 22b, and 32b of the PATH_1 to change the bandwidth of the shared protection path of the PATH_2 to 6 TSs.

Similarly, when the term T2 ends and the term T1 starts, the ODUflex control parts 23 and 33 of the nodes 20 and 30 change the bandwidth of the shared protection path of the PATH_1, and instruct the cross connect (XC) parts 24 and 34 and the ODUflex parts 22a, 32a, 22b, and 32b of the PATH_1 to change the bandwidth of the shared protection of the PATH_2 to 2 TSs.

<OTN Transmission System in Fifth Embodiment>

Figure 20:
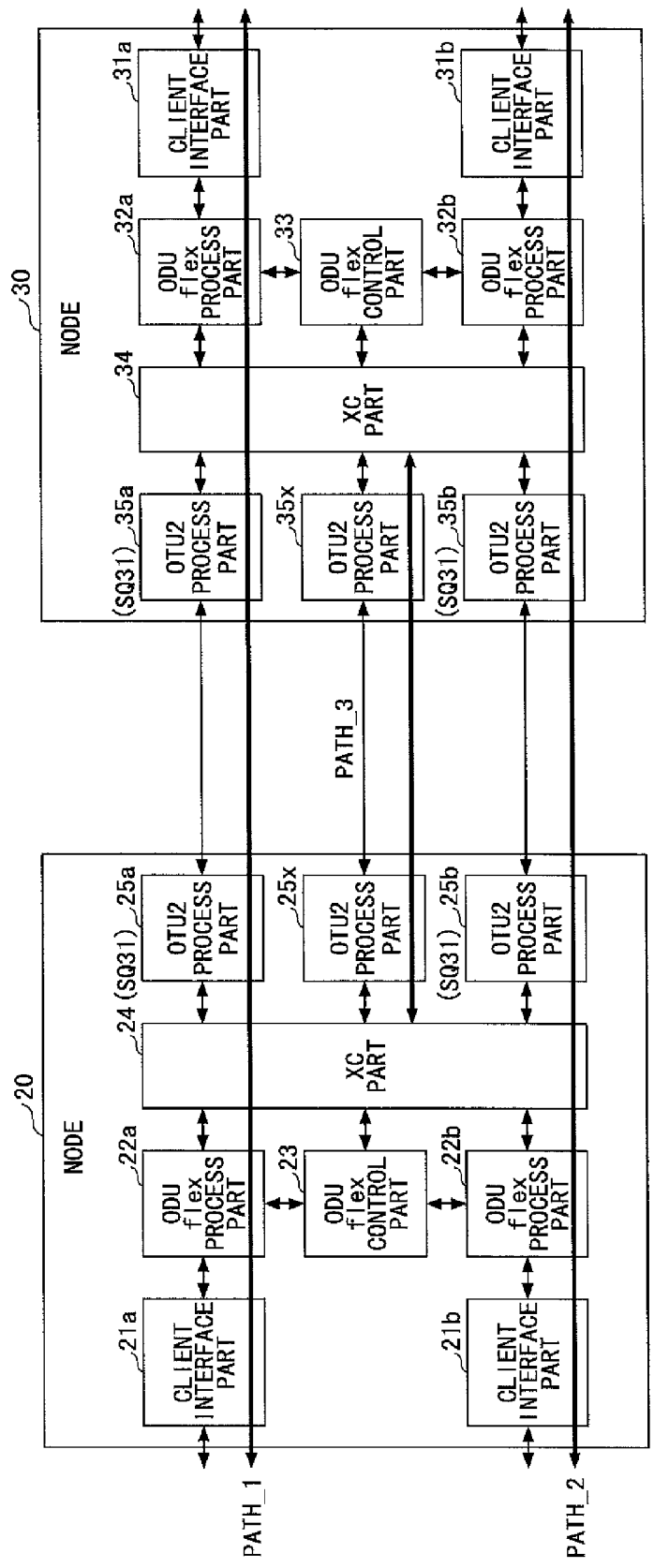
FIG. 20 is a diagram illustrating a configuration of an OTN transmission system in a fifth embodiment.

FIG. 20 is a diagram illustrating a configuration of an OTN transmission system in a fifth embodiment. In FIG. 20, parts that are the same as those in FIG. 13 are indicated by the same reference numerals and the explanation thereof will be omitted.

In FIG. 20, the PATH_1 is bi-directional, connects between the OTU2 process parts 25a and 35a, and transmits the OTU2 frame. The PATH_2 is bi-directional, connects between the OTU2 process parts 25b and 35b, and transmits the OTU2 frame. The PATH_1 and the PATH_2 are the working paths of 8 TSs, that is, 10 Gbps, respectively. Also, the shared protection path of 8 TSs, that is, 10 Gbps being bi-directional is provided between the OTU2 process parts 25x and 35x. In the shared protection path, the cross connect setting of the ODUflex supporting the Ethernet frame is not conducted beforehand.

Also, a threshold for protection path preparation and a preparation TS number (=1 TS) are set beforehand in the memories 23b and 33b internally implemented in the ODUflex control parts 23 and 33. The threshold for the protection path preparation defines a value of arbitrary FEC correction number in a case of a lower error rate than an error rate at a failure switch event.

The following sequence numbers are also indicated with parentheses in FIG. 20.

Sequence (SQ31): The OTU2 process parts 25a and 35a monitor the FEC correction number, and an error number of an error rate for the OTU2 including the PATH_1, and report them to the ODUflex control parts 23 and 33. The OTU2 process parts 25b and 35b monitor the correction number of the FEC and the error rate for the OTU2 including the PATH_2, and report them to the ODUflex control parts 23 and 33.

Figure 21:
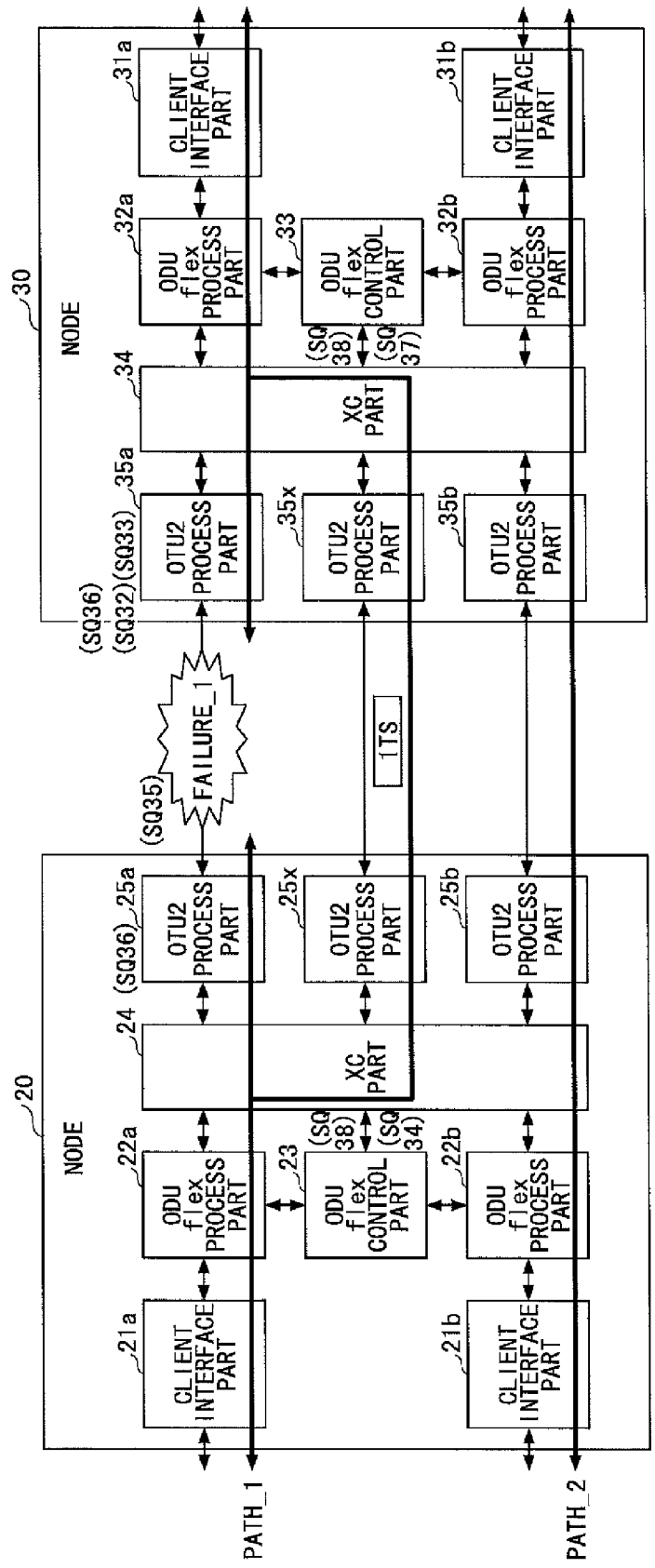
FIG. 21 is a diagram illustrating an operation when a line failure occurs in the fifth embodiment.

As illustrated in FIG. 21, a FAILURE_1 occurs between the OTU2 process parts 25a and 35a, and a line quality in the OTU2 process part 35a is degraded. Sequence numbers are also indicated with parentheses in FIG. 21.

Sequence (SQ32): At the receiver side, the OTU2 process part 35a of the node 30 detects the FEC correction number for the OTU2 including the PATH_1.

Sequence (SQ33): The OTU2 process part 35a detects that the FEC correction number of the OTU2 including the PATH_1 exceeds the threshold for the protection path preparation (which is arbitrary set) and transmission channel quality is degraded.

Sequence (SQ34): The ODUflex control part 23 conducts the cross connect setting so that the bandwidth for 1 TS in the ODTflex frame of 8 TSs of the PATH_1 passes the shared protection path. By the cross connect setting, data for 1 TS are transmitted through the shared protection path. At this point, quality is degraded with no actual failure, in which the LOS is not detected. Accordingly, at the node 30, the switching process is not performed to switch from the working path to the protection path.

Sequence (SQ35): Since the quality is further degraded, the actual failure occurs such that the LOS is detected on the PATH_1.

Sequence (SQ36): The OTU2 process part 35a of the node 30 detects the LOS of the PATH_1, and the ODUflex control part 33 of the node 30 collects the alarm information. After that, the ODUflex control part 33 of the node 30 sends the alarm information by the overhead of the OTU2 frame from the OTU2 process part 35a to the node 20 being the opposite node.

Sequence (SQ37): The ODUflex control part 33 instructs the cross connect setting to the cross connect (XC) part 34 so as to supply the shared protection path of 1 TS of the PATH_1 to the ODUflex process part 32a. The operation starts.

Sequence (SQ38): The ODUflex control part 23 of the node 20 instructs the cross connect setting to the cross connect (XC) part 24 so as to increase the shared protection path of the PATH_1 from 1 TS to 8 TS. The ODUflex control part 33 instructs the cross connect setting to the cross connect (XC) part 34 to supply the shared protection path of 8 TSs of the PATH_1 to the ODUflex process part 32a. The operation starts with 8 TSs.

<Flowchart in Fifth Embodiment>

Figure 22:
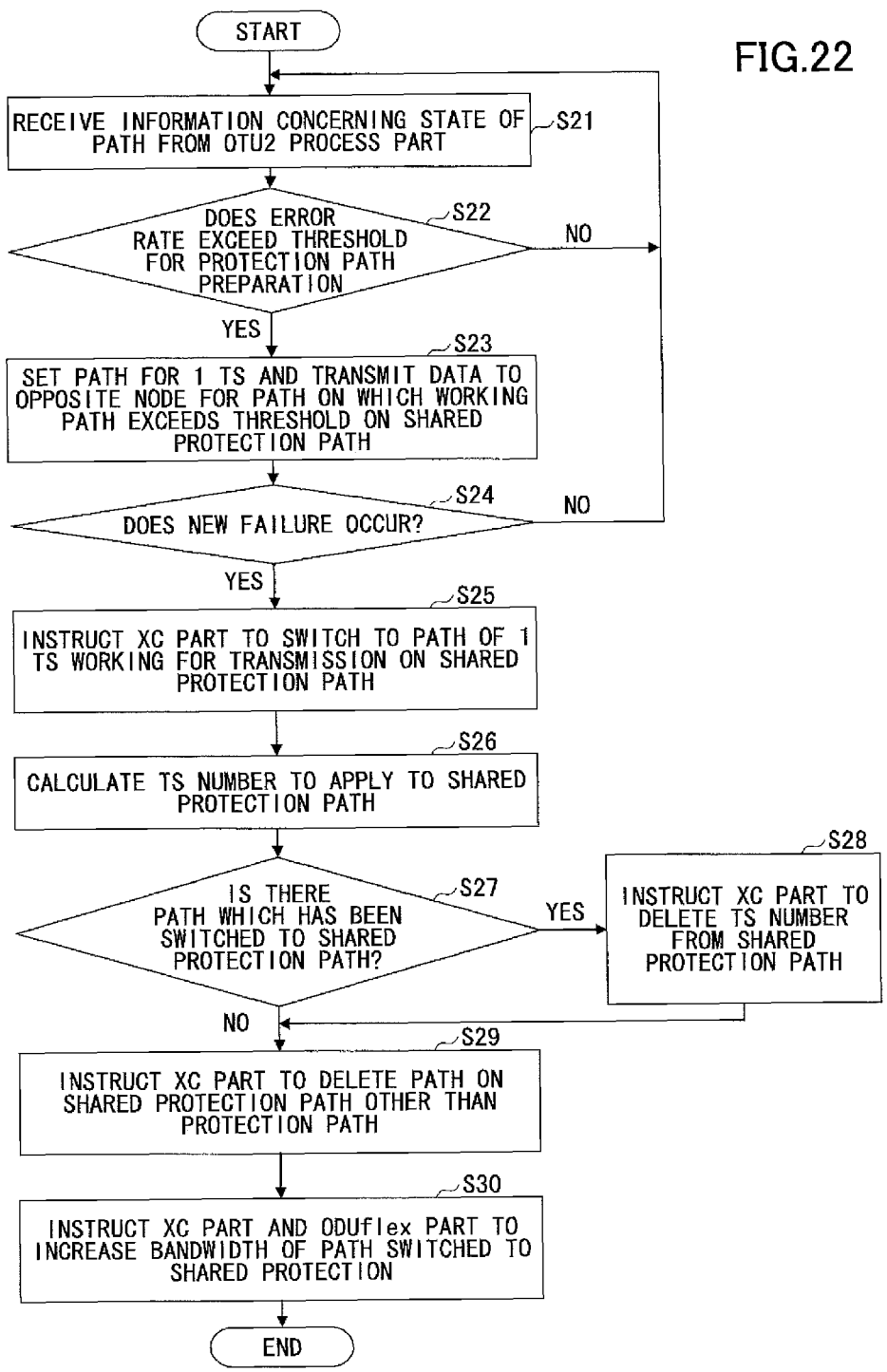
FIG. 22 is a flowchart for explaining a process executed by ODUflex control parts in the fifth embodiment.

FIG. 22 is a flowchart for explaining a process executed by the ODUflex control parts in a fifth embodiment. In FIG. 22, in step S21, the ODUflex control part 23 receives information such as the FEC correction number and the like pertinent to a state of the path of the working paths from the OTU2 process parts 25a, 25b, and 25x.

In step S22, the ODUflex control part 23 determines whether the FEC correction number of the working path exceeds the threshold for the protection path preparation. If the FEC correction number of the working path does not exceed the threshold for the protection path preparation, the ODUflex control part 23 advances to step S21. If the FEC correction number of the working path exceeds the threshold for the protection path preparation, in step S23, the ODUflex control part 23 conducts the cross connect setting so that the bandwidth for 1 TS in the ODUflex frame of the path (referred as the PATH_1), in which the FEC correction number of the working path exceeds the threshold for the protection path preparation, passes the shared protection path. Data for 1 TS are transmitted through the shared protection path.

Next, in step S24, the ODUflex control part 23 determines whether a new failure occurs. If no new failure occurs, the ODUflex control part 23 advances to step S21. If the new failure occurs, in step S25, the ODUflex control part 33 instructs the cross connect setting to the cross connect (XC) part 34 so that the shared protection path for 1 TS of the PATH_1 is supplied to the ODUflex process part 32a. In step S26, the ODUflex control part 23 calculates the TS number for each path to assign to the shared protection path by the expression (1).

Next, in step S27, the ODUflex control part 23 determines whether there is a path which has been switched to the shared protection path.

If there is the path which has been switched to the shared protection path, in step S28, the ODUflex control part 23 instructs the cross connect (XC) part 24 to delete the TS number demanded to be deleted from the shared protection path, and advances to step S29. If there is no path which has been switched, the ODUflex control part 23 directly advances to step S29 without deleting the TS number.

In step S29, the ODUflex control part 23 instructs the cross connect (XC) part 24 to delete paths on the shared protection path other than the path to protect.

In step S30, the ODUflex control parts 23 and 33 instruct the cross connect setting to the cross connect (XC) parts 24 and 34 in order to switch to the shared protection path from 1 TS which has been switched to the TS number (which may be 8 TSs), which is calculated in step S28, for the PATH_1 which is demanded to protect due to an occurrence of the new failure. Also, the ODUflex control parts 23 and 33 instruct the path resizing process for changing the TS number demanded to protect by using the LCR protocol and the BWR protocol to the ODUflex process parts 22a, 22b, 32a, and 32b. After that, this process is terminated.

In the fifth embodiment, it is possible to rapidly switch the working path where the failure occurs to the shared protection path when the failure occurs.

<OTN Transmission System in Sixth Embodiment>

A sixth embodiment corresponds to a variation of the fifth embodiment. A configuration of the OTN transmission system in the sixth embodiment is the same as that illustrated in FIG. 20. However, multiple thresholds for protection path preparation and multiple preparation TS numbers respective to the multiple threshold are set and stored in the memories 23b and 33b internally implemented in the ODUflex control parts 23 and 33. A threshold of the FEC correction number, in which the maximum preparation TS number=8 TSs is satisfied, is defined. A first threshold indicates a value corresponding to 25% of the threshold of the FEC correction number, and a preparation TS number=2 TSs is set. A second threshold indicates a value corresponding to 50% of the threshold of the FEC correction number, and the preparation TS number=4 TSs is set. A third threshold indicates a value corresponding to 75% of the threshold of the FEC correction number, and the preparation TS number=6 TSs. A fourth threshold is set to be the FEC correction number where the maximum preparation TS number=8 TSs.

Figure 23:
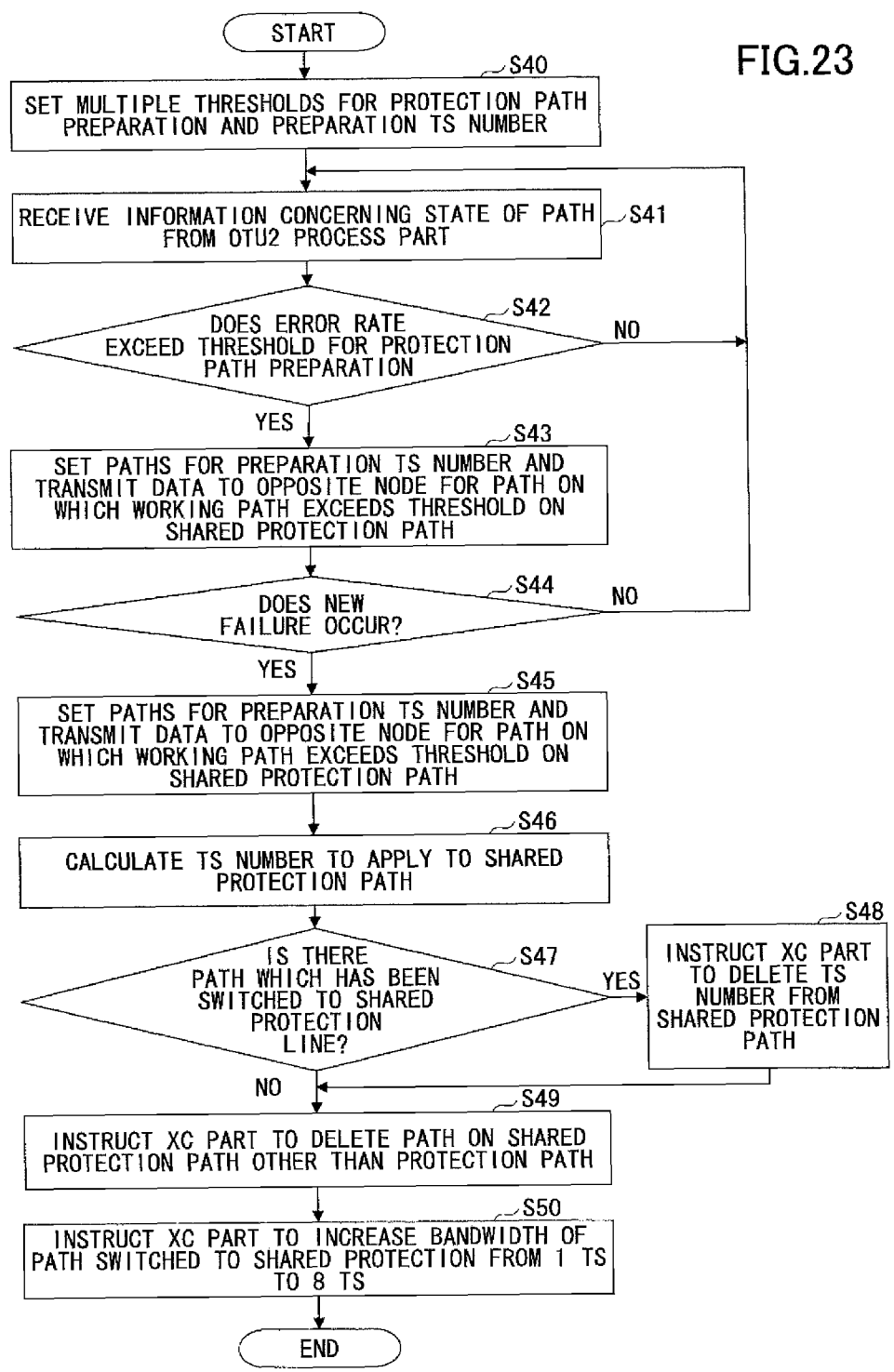
FIG. 23 is a flowchart for explaining a process executed by ODUflex control parts in a sixth embodiment.

FIG. 23 is a flowchart for explaining a process executed by the ODUflex control parts 23 and 33 in the sixth embodiment. In FIG. 23, in step S40, the first through fourth thresholds for the protection path preparation and the preparation TS numbers respective to the first through fourth thresholds are set in the memories 23b and 33b.

In step S41, the ODUflex control part 23 receives the information such as the FEC correction number or the like pertinent to the state of the path of the working path from the OTU2 process parts 25a, 25b, and 25x.

In step S42, the ODUflex control part 23 determines whether the FEC correction number of the working path exceeds each of the first through fourth thresholds. If the FEC correction number does not exceed any of the first through fourth thresholds, the ODUflex control part 23 advances to step S41. If the FEC correction number of the working path exceeds at least one of the first through fourth thresholds, in step S43, the ODUflex control part 23 conducts the cross connect setting so that in the ODUflex frames of the path in which the FEC correction number exceeds at least one of the first through fourth thresholds, preparation TS numbers (2 TSs, 4 TSs, 6 TSs, or 8 TSs) respective to values (the first through fourth thresholds) which the FEC correction number exceeds pass the cross connect setting. Data for 2 TSs through 8 TSs are transmitted via the shared protection path.

Next, in step S44, the ODUflex control part 23 determines whether a new failure occurs. If the new failure does not occur, the ODUflex control part 23 advances to step S41. If the new failure occurs, in step S45, the ODUflex control part 23 instructs the cross connect (XC) part 34 to conduct the cross connect setting so as to supply the shared protection path for the preparation TS number (2 TSs, 4 TSs, 6 TSs, or 8 TSs) of the path where the new failure occurs. In step S46, the ODUflex control part 23 calculates the TS number for each of the paths to assign to the shared protection path.

Next, in step S47, the ODUflex control part 23 determines whether there is the path which has been switched to the shared protection path.

If there is the path which has been switched to the shared protection path, in step S48, the ODUflex control part 23 instructs the cross connect (XC) part 24 to delete the TS number demanded to delete from the shared protection number, and advances to step S49. If there is no path which has been switched, the ODUflex control part 23 instructs the cross connect (XC) part 24 advances to step S49 without deleting the TS number.

In step S49, the ODUflex control part 23 instructs the cross connect (XC) part 24 to delete the path on the shared protection path other than the path to protect.

In step S50, the ODUflex control parts 23 and 33 instruct the cross connect setting to the cross connect (XC) parts 24 and 34 to switch to the shared protection path from 1 TSs which has been switched, to the TS number (which may be 8 TSs) calculated in step S48, for the PATH_1 demanded to protect. Also, the ODUflex control parts 23 instructs the ODUflex process parts 22a, 22b, 32a, and 32b to conduct the path resizing process for changing the TS number of the path to protect by using the LCR protocol and the BWR protocol. After that, this process is terminated.

In the sixth embodiment, it is possible to rapidly switch the working path where the failure occurs to the shared protection path when the failure occurs.

<OTN Transmission System in Seventh Embodiment>

A seventh embodiment corresponds to another variation of the fifth embodiment. A configuration of the OTN transmission system in the seventh embodiment is the same as that illustrated in FIG. 20. However, the threshold for the protection path preparation, the preparation TS number (=1 TS), and a threshold for switching the path are set and stored in the memories 23b and 33b internally implemented in the ODUflex control parts 23 and 33. As for the threshold for the protection path preparation, a value of an arbitrary FEC correction number is defined in a case of a lower error rate than an error rate for detecting the LOS. As for the threshold for the switching process, the value of the arbitrary FEC correction number being greater than the threshold for the protection path preparation is defined in a similar case of the lower error rate than the error rate for detecting the LOS.

Figure 24:
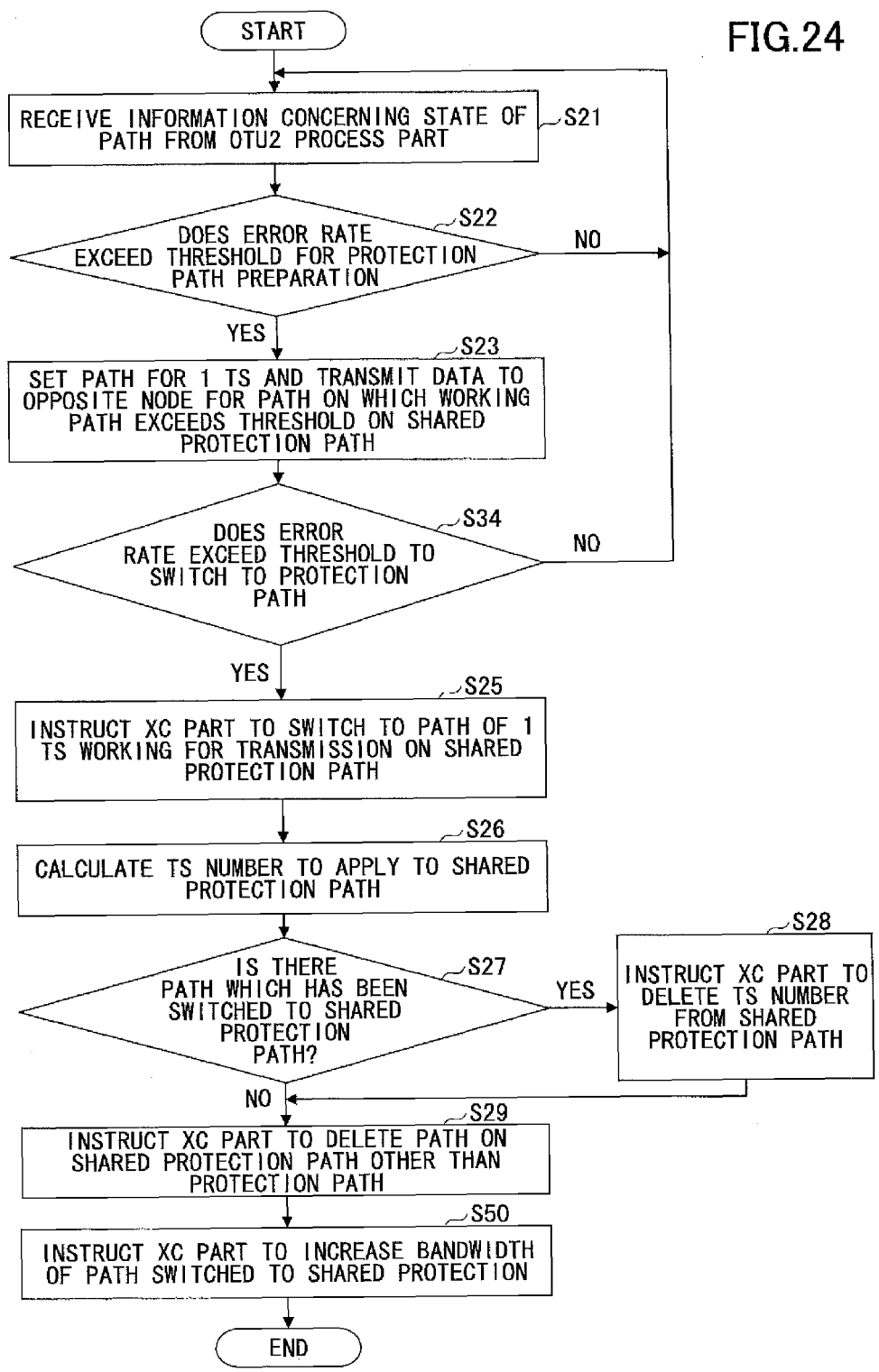
FIG. 24 is a flowchart for explaining a process executed by ODUflex control parts in a seventh embodiment.

FIG. 24 is a flowchart for explaining a process executed by the ODUflex control parts 23 and 33 in the first embodiment. In FIG. 24, parts that are the same as those in FIG. 22 are indicated by the same reference numerals and the explanation thereof will be omitted. In FIG. 24, in step S21, the ODUflex control part 23 receives information such as the FEC correction number pertinent to the state of the path of the working path or the like from the OTU2 process parts 25a, 25b, and 25x.

In step S22, the ODUflex control part 23 determines whether the FEC correction number of the working path exceeds the threshold for the protection path preparation. If the FEC correction number does not exceed the threshold for the protection path preparation, the ODUflex control part 23 advances to step S21. If the FEC correction number of the working path exceeds the threshold for the protection path preparation, in step S23, the ODUflex control part 23 conducts the cross connect setting so that the bandwidth of 1 TS in the ODUflex frame of the path (may be referred as the PATH_1), in which the FEC correction number of the working path exceeds the threshold for the protection path preparation, passes the shared protection path. Accordingly, data are transmitted for 1 TS via the shared protection path.

Next, in step S34, the ODUflex control part 23 determines whether the FEC correction number of the working path exceeds the threshold for the switching process. If the FEC correction number does not exceed the threshold for the switching process, the ODUflex control part 23 advances to step S21. If the FEC correction number exceeds the threshold for the switching process, in step S25, the ODUflex control part 33 instructs the cross connect (XC) part 34 to conduct the cross connect setting to supply the shared protection path of 1 TS of the PATH_1 to the ODUflex process part 32a. In step S26, the ODUflex control part 23 calculates the TS number for each path to assign to the shared protection path by the expression (1).

Next, in step S27, the ODUflex control part 23 determines whether there is the path which has been switched to the shared protection path.

If there is the path which has been switched, in step S28, the ODUflex control part 23 instructs the cross connect (XC) part 24 to delete the TS number demanded to delete from the shared protection path, and advances to step S29. If there is no path which has been switched, the ODUflex control part 23 advances to step S29.

In step S29, the ODUflex control part 23 instructs the cross connect (XC) part 24 to delete the path on the shared protection path other than the path to protect.

In step S50, the ODUflex control parts 23 and 33 instruct the cross connect setting to the cross connect (XC) parts 24 and 34 to switch to the shared protection path from 1 TS which has been switched to the TS number (may be 8 TSs) calculated in step S28 for the PATH_1 demanded to protect since the new failure occurs. Also, the ODUflex control parts 23 and 33 instruct the ODUflex process parts 22a, 22b, 32a, and 32b to conduct the path resizing process for changing the TS number of the path to protect by using the LCR protocol and the BWR protocol. After that, this process is terminated.

In the seventh embodiment, it is possible to rapidly switch the working path where the failure occurs to the shared protection path when the failure occurs.

<OTN Transmission in Eighth Embodiment>

Figure 25:
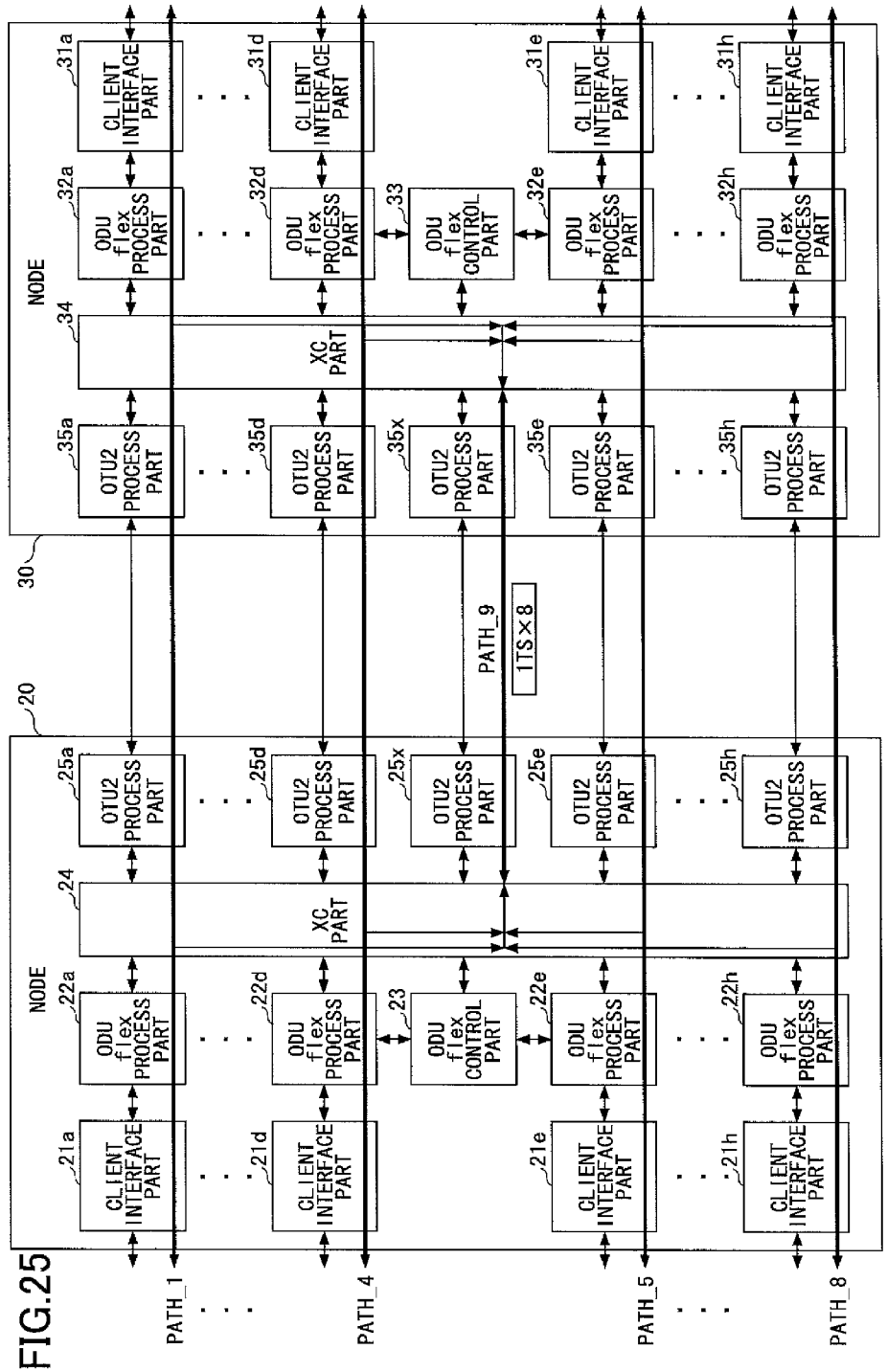
FIG. 25 is a diagram illustrating a configuration of an OTN transmission system in an eighth embodiment.

FIG. 25 is a diagram illustrating a configuration of an OTN transmission system in the eighth embodiment. In FIG. 25, in the node 20, the Ethernet frame supplied from the client is received by the client interface parts 21a through 21h, and is supplied to the ODUflex process parts 22a through 22h. The ODUflex process parts 22a through 22h map the Ethernet frame into the ODUflex which is the accommodation format at the LO side of the OTN.

In a case of mapping the ODUflex into the ODU2, the ODUflex control parts 23 comprehends the bandwidth to be used and the line state pertinent to each of the paths and determines the bandwidth of the ODUflex to be assigned for the protection, by coordinating with each of the ODUflex process parts 22a through 22h, the cross connect (XC) part 24, and the OTU2 process parts 25a to 25d, 25e to 25h, and 25x which are interfaces at the network side, in the node 20. After that, the ODUflex control part 23 instructs the actual cross connect setting to the cross connect (XC) part 24. In the eighth embodiment, in a normal operation without the failure, in the cross connect (XC) part 24, a cross connect is performed for data for each bandwidth for 1 TS of the PATH_1 through PATH_8 of the working paths, to the OTU2 process part 25x.

The ODUflex frame from the ODUflex process parts 22a through 22h is supplied to the OTU2 process parts 25a through 25h or 25x at the HO side through the cross connect (XC) part 24, and is mapped into the ODU2. Moreover, the overhead such as the FEC information or the like is added to the ODUflex frame mapped into the ODU2, and the ODUflex frame is transmitted as the OTU2 frame to the OTU2 process parts 35a to 35d, 35e to 35h and 35x of the node 30 of the opposite node.

In the node 30, the OTU2 process parts 35a through 35h and 35x receive the OTU2 frame transmitted through the network, and extract the ODU2. Moreover, the ODUflex frame is demapped from the ODU2. The ODUflex frame, which is output from OTU2 process parts 35a through 35h and 35x, is supplied to the ODUflex process parts 32a through 32h through the cross connect (XC) part 34 by the cross connect setting of the ODUflex control part 33.

Each of the ODUflex process parts 32a through 32h demaps the Ethernet frame from the ODUflex frame. The Ethernet frame is supplied from the client interface parts 31a through 31h to the client. Transmission from the node 20 to the node 30 is described above. Transmission from the node 30 to the node 20 is conducted in the same manner.

The PATH_1 connects in a bi-direction between the OTU2 process parts 25a and 35a. The PATH_2 connects in the bi-direction between the OTU2 process parts 25b and 35b. The PATH_3 connects in the bi-direction between the OTU2 process parts 25c and 35c. The PATH_4 connects in the bi-direction between the OTU2 process parts 25d and 35d. The PATH_1 through PATH_4 are the working paths of 8 TSs, that is, 10 Gbps.

Also, the PATH_5 connects in the bi-direction between the OTU2 process parts 25e and 35e. A PATH_6 and a PATH_7 may exist. The PATH_6 connects in the bi-direction between OTU2 process parts 25f and 35f (not depicted). The PATH_7 connects in the bi-direction between OTU2 process parts 25g and 35g (not depicted). A PATH_8 connects in the bi-direction between the OTU2 process parts 25h and 35h. The PATH_1 through the PATH_8 are the working paths of 8 TSs, that is, 10 Gbps. Also, the shared protection path which is the bi-direction of 8 TSs, that is 10 Gbps between the OTU2 process parts 25x and 35x. A total 8 TSs, in which the bandwidth for 1 TSs is allocated to each set of data of the PATH_1 through the PATH_8 of the working paths, is transmitted.

<Line Failure Occurrence>

Figure 26:
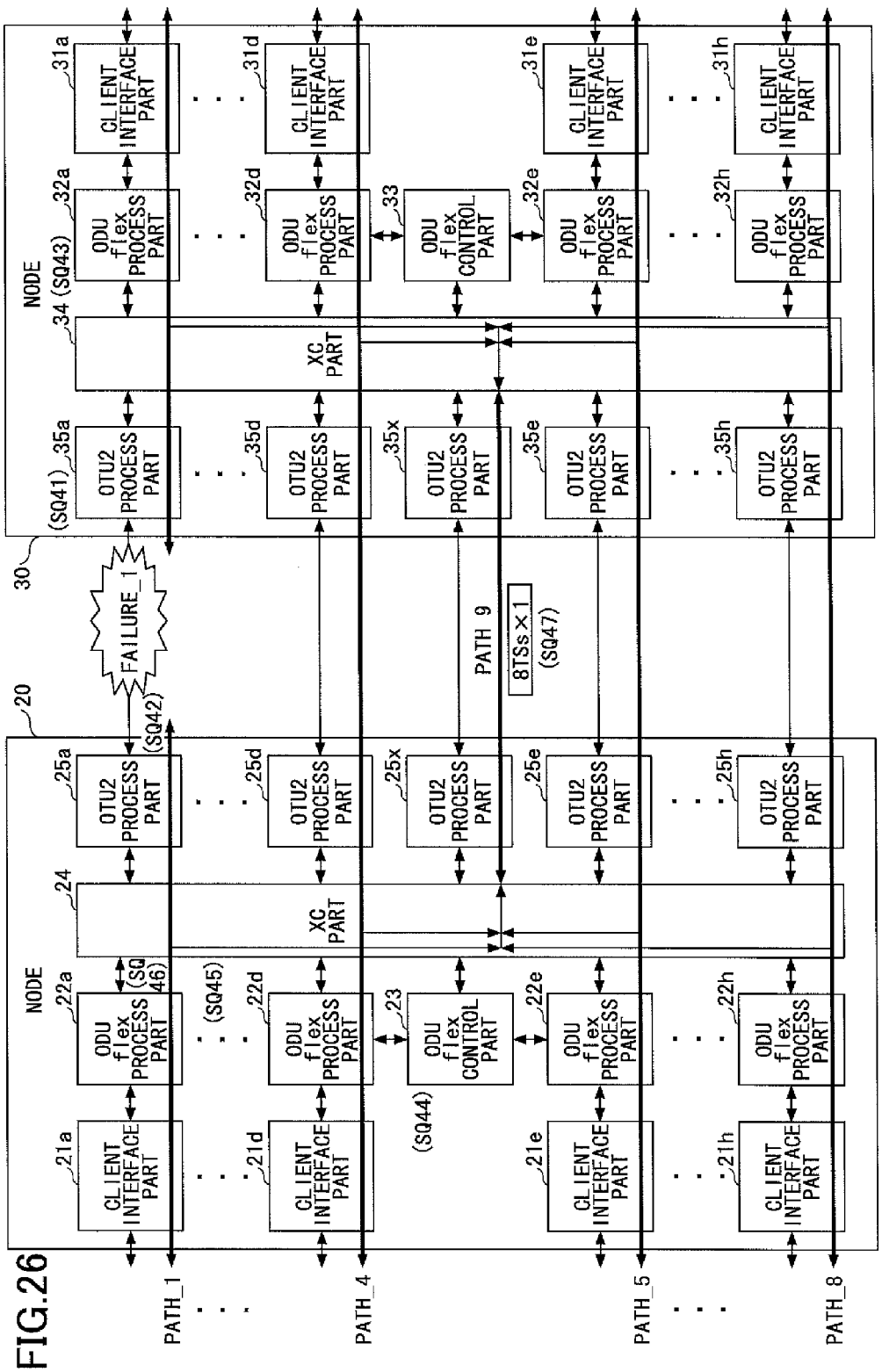
FIG. 26 is a diagram for explaining an operation when a line failure occurs in the eighth embodiment.

As illustrated in FIG. 26, the FAILURE_1 occurs on the PATH_1 in a direction from the node 20 to the node 30 between the OTU2 process parts 25a and 35a. Sequence numbers are also indicated with parentheses in FIG. 26.

Sequence (SQ41): At the receiver side, the OTU2 process part 35a of the node 30 detects the LOS of the PATH_1, and the ODUflex control part 33 of the node 30 collects the alarm information. Then, the ODUflex control part 33 of the node 30 sends the alarm information to the node 20 being the opposite node by using the overhead of the OTU2 frame from the OTU2 process part 35a.

Sequence (SQ42): The OTU2 process part 25a of the node 20 detects the alarm information from the overhead of the OTU2 frame, and reports the failure state of the PATH_1 to the ODUflex control part 23.

Sequence (SQ43): The ODUflex control part 33 of the node 30 instructs the cross connect setting to the cross connect (XC) part 34 to supply the shared protection path of 1 TS of the PATH_1 to the ODUflex process part 32a. Then, the operation starts.

Sequence (SQ44): The ODUflex control part 23 of the node 20 determines a use bandwidth of the shared protection path and the bandwidth to set the working path of the PATH_1 where the FAILURE_1 occurs to the shared protection path, by the expression (1).

Sequence (SQ45): The ODUflex control part 23 of the node 20 deletes a first TS from each of the PATH_2 through PATH_8 on the shared protection path.

Sequence (SQ46): The ODUflex control part 23 of the node 20 instructs the cross connect (XC) part 24 to increase the ODUflex frame of the PATH_1 carried on the shared protection path from 1 TS to the bandwidth Bs=8 TSs calculated by the expression (1).

Sequence (SQ47): The ODUflex control part 33 of the node 30 instructs the cross connection setting to the cross connect (XC) part 34 to supply the shared protection path of the PATH_1 of 8 TSs from the shared protection path to the ODUflex process part 32a. Then, the operation starts.

<Flowchart in Eighth Embodiment>

Figure 27:
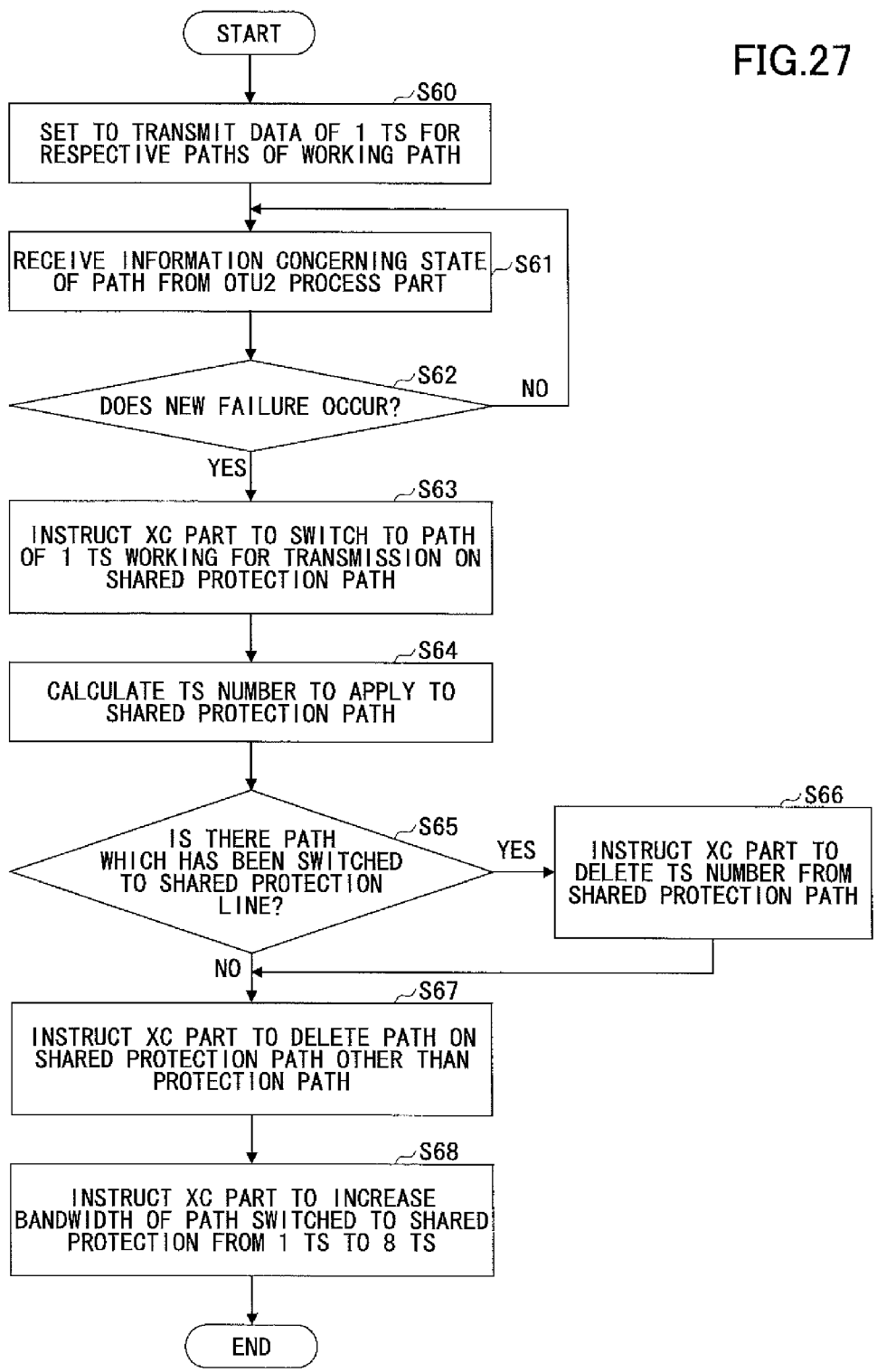
FIG. 27 is a flowchart for explaining a process executed by ODUflex control parts in the eighth embodiment.

FIG. 27 is a flowchart for explaining a process executed by the ODUflex control parts 23 and 33 in the eighth embodiment. In FIG. 27, in step S60, the ODUflex control part 23 sets to transmit data of the bandwidth for 1 TS in each of multiple paths of the working paths through the shared protection path.

In step S61, the ODUflex control part 23 receives the information such as the FEC correction number pertinent to each state of the paths of the working paths from the OTU2 process parts 25a to 25d, 25e to 25h, and 25x.

Next, in step S62, the ODUflex control part 23 determine whether a new failure occurs. If the new failure does not occur, the ODUflex control part 23 advances to step S61. If the new failure occurs, in step S63, the ODUflex control part 33 instruct the cross connect (XC) part 34 to conduct the cross connect setting so as to supply the shared protection path of 1 TS of the PATH_1 to the ODUflex process part 32a. In step S64, the ODUflex control part 23 calculates the TS number for each of the paths to assign to the shared protection path by the expression (1).

Next, in step S65, the ODUflex control part 23 determines whether there is the path which has been switched to the shared protection path.

If there is the path which has been switched, in step S66, the ODUflex control part 23 instructs the cross connect (XC) part 24 to delete the TS number demanded to delete from the shared protection, and advances to step S67. If there is no path which has been switched, the ODUflex control part 23 advances to step S67 without deleting the TS number.

In step S67, the ODUflex control part 23 instructs the cross connect (XC) part 24 to delete the path on the shared protection path other than the path to protect.

In step S68, the ODUflex control parts 23 and 33 instruct the cross connect setting to the cross connect (XC) parts 24 and 34 to switch to the shared protection path from 1 TS to the TS number (may be 8 TSs) calculated in step S66 for the path (may be the PATH_1) to protect since the new failure occurs. Also, the ODUflex control parts 23 and 33 instruct the ODUflex process parts 22a to 22d, 22e to 22h, 32a to 32d, and 32e to 32h to conduct the path resizing process for changing the TS number of the path to protect by using the LCR protocol and the BWR protocol. After that, this process is terminated.

In the eighth embodiment, it is possible to rapidly switch the working path where the failure occurs to the shared protection path when the failure occurs.

<Configuration of OTU Frame>

Figure 28:
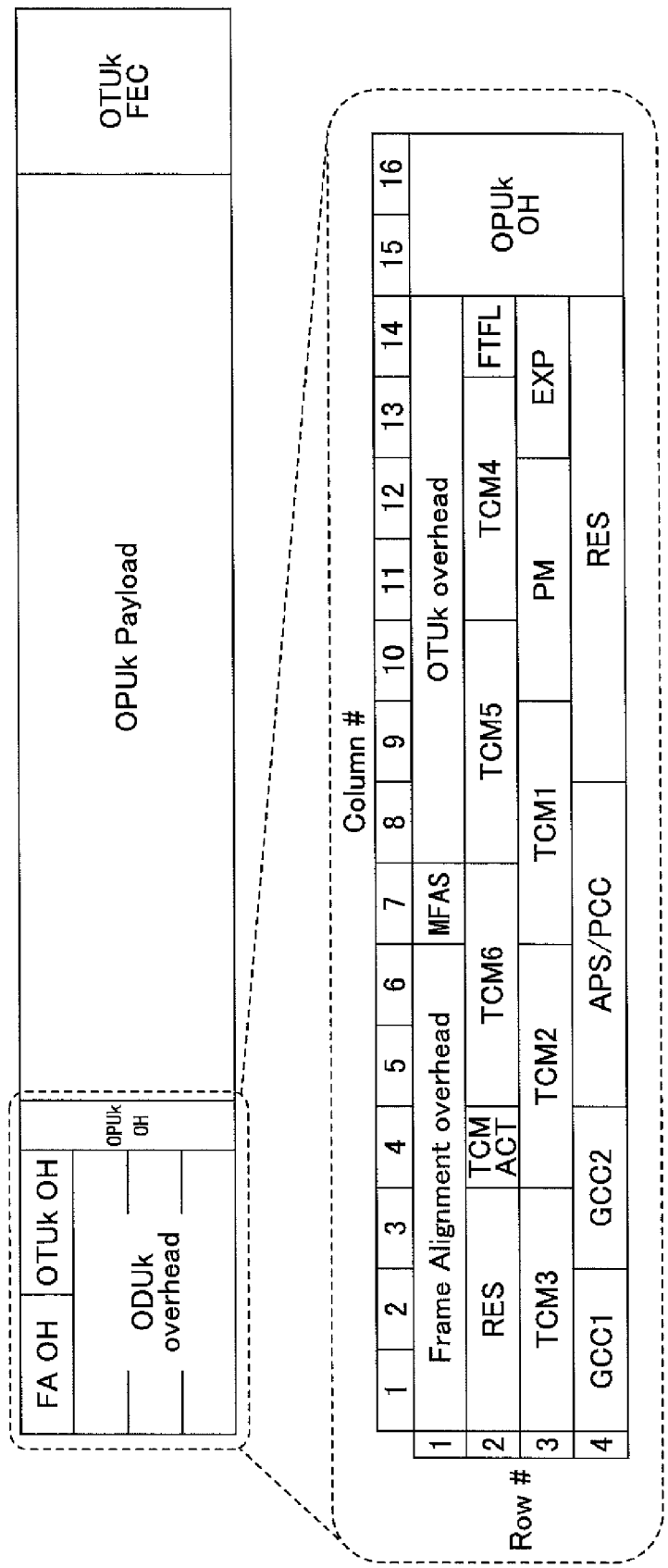
FIG. 28 is a diagram illustrating a frame configuration of an example of an OTU frame.

FIG. 28 is a diagram illustrating a frame configuration of an example of the OTU frame. The OTU frame includes an overhead portion, an OPUk (k denotes 0 or a positive integer) payload portion, and OTUkFEC (Optical channel Transport Unit k Forward Error Correction).

The overhead portion has a size of 16 bytes×4 rows of a $1^{st}$ column to a $16^{th}$ column, and is used for a management of a connection and quality. The OPUk payload portion has a size of 3808 bytes×4 rows of a $17^{th}$ column to a $3824^{th}$ column, and accommodates the client signal which provides one or more services. The OTUkFEC portion has a size of 256 bytes×4 rows of a $3825^{th}$ column to a $4080^{th}$ column, and is used to correct an error which occurs during transmission. An ODUk portion corresponds to a portion in which an overhead byte (OH) used for the management of the connection and the quality is added to the OPUk payload portion. Also, the OTUk portion corresponds to a portion in which frame synchronization, the overhead byte used for the management of the connection, and the OTUkFEC portion are added to the ODUk portion.

Figure 29:
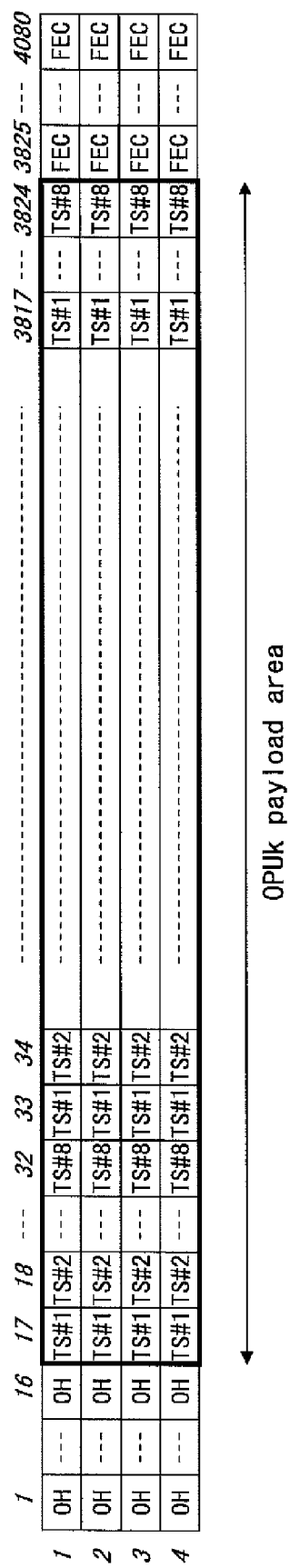
FIG. 29 is a diagram illustrating a state of assigning tributary slots TS#1 through TS#8 to an HO_ODU2.

The BDI used to send the alarm information is assigned to an OTUk overhead of a first row of a $10^{th}$ column. The GCC0 is assigned to the OTUk over head of the first row of each of an $11^{th}$ and $12^{th}$ column. The APS is assigned to the ODUk overhead of a fourth row of a $5^{th}$ to $8^{th}$ columns. FIG. 29 illustrates a state of assigning tributary slots TS#1 through TS#8 in which the bandwidth is approximately 1.25 Gbps to the HO_ODU2.

Regarding the ODUflex frame, a frame format of the ODUflex is the same as an ODUframe format. In the ODUflex frame, it is possible to vary the bandwidth with hitless in which data being transmitted is not blocked by a tributary slot unit of 1.25 G. The TS is decreased and increased by a control using an OPUflex overhead and a Resize Control Overhead (RCOH)1, a RCOH2, or a RCOH3 of an HO_OPUk overhead. For the ODUflex frame, a frame bandwidth is varied by changing the TS number in response to an operation of a control protocol, so as to adjust the bandwidth to be suitable to accommodate the client signal. Also, it is possible to implement to change the bandwidth without disconnection.

Moreover, in a case of forming the shared protection path in the network, it is possible to assign all bandwidths to save a single working path, and to simultaneously save multiple working paths by dividing the bandwidth. Furthermore, in the above described configuration for sending the ODUflex frame to both the working path and the shared protection path between nodes 20 and 30, it is possible to realize a protection switch at higher speed than a configuration for sending the frame after the switch is conducted.

As described above, according to the first to the eighth embodiments, it is possible to protect multiple paths of the working paths where failures occur.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure protection method of a network connecting between nodes by multiple working paths and a protection path, the failure protection method comprising:
   determining, respectively, a first allocation bandwidth and a second allocation bandwidth to allocate to a first detected path and a second detected path in each of which a failure is detected, in multiple paths being set to the multiple working paths, depending on the first detected path and the second detected path;
   switching the first detected path and the second detected path from two of the multiple working paths to the protection path; and
   transmitting data to be transmitted by the first detected path and the second detected path, by using the first allocation bandwidth and the second allocation bandwidth determined within an entire bandwidth of the protection path.

2. The failure protection method as claimed in claim 1, wherein an allocation bandwidth to allocate to a detected path where the failure is detected is determined by multiplying a ratio of a bandwidth of the detected path to a total bandwidth of entire paths in each of which the failure is detected, with the entire bandwidth of the protection path, for each of the first allocation bandwidth and the second allocation bandwidth which is the allocation bandwidth with respect to the first detected path and the second detected path each as the detected path.

3. The failure protection method as claimed in claim 1, wherein a ratio of an allocation bandwidth to allocate to a detected path where the failure is detected is set beforehand for each of the multiple paths.

4. The failure protection method as claimed in claim 1, wherein a ratio of a protection bandwidth to allocate to a detected path is set beforehand depending on time for each of the multiple paths.

5. The failure protection method as claimed in claim 1, wherein for a path where an error rate exceeds a first threshold which is set beforehand in the multiple paths being set to the multiple working paths, a path setting is conducted to the protection path in order to protect the path exceeding the first threshold.

6. The failure protection method as claimed in claim 5, wherein when the failure is detected on the path where the error rate exceeds the first threshold, the detected path is switched from the working path in which the path setting is conducted, to the protection path.

7. The failure protection method as claimed in claim 5, wherein in first data transmitted by the path where the error rate exceeds a first threshold, second data of a rate corresponding to the first threshold are transmitted by an allocation bandwidth determined within the entire bandwidth of the protection path where the path setting is conducted, for each of the first allocation bandwidth and the second allocation bandwidth which is the allocation bandwidth.

8. The failure protection method as claimed in claim 5, wherein when the error rate of a path being set to the working path exceeds a second threshold being greater than the first threshold, the path in which the error rate exceeds the second threshold is switched from the working path to the protection path where the path is set.

9. A failure protection method in which multiple working paths and a protection path connect between nodes, the failure protection method comprising:
    transmitting, by a transmitter node, partial data respective to the multiple working paths by using the protection path;
    switching, by a receiver node, a working path where a failure is detected to the partial data transmitted by using the protection path when the failure is detected;
    determining, by the transmitter node, respective bandwidths of the protection path which are assigned for two or more working paths in each of which the failure is detected at the receiver node; and
    transmitting, by the transmitter node, data of the two or more working paths in each of which the failure is detected, by using the respective bandwidths determined within the protection path.

10. A node apparatus in a network connecting between nodes by multiple working paths and a protection path, the node apparatus comprising:
    a determination part configured to determine, respectively, a first allocation bandwidth and a second bandwidth to allocate to a first detected path and a second detected path in each of which a failure is detected in multiple paths being set to the multiple working paths, depending on the first detected path and the second detected path;
    a switch part configured to switch the first detected path and the second detected path from two of the multiple working paths to the protection path; and
    a transmission part configured to transmit data to be transmitted by the first detected path and the second detected path, by using the first allocation bandwidth and the second allocation bandwidth determined within an entire bandwidth of the protection path.

11. The node apparatus as claimed in claim 10, wherein a determination part determines the allocation bandwidth to allocate to a detected path where the failure is detected, by multiplying a ratio of a bandwidth of the detected path to a total bandwidth of entire paths in each of which the failure is detected, with the entire bandwidth of the protection path, for each of the first allocation bandwidth and the second allocation bandwidth which is the allocation bandwidth with respect to the first detected path and the second detected path each as the detected path.

12. The node apparatus as claimed in claim 10, wherein the determination part uses a ratio of an allocation bandwidth to allocate to a detected path where the failure is detected, in which the ratio is set beforehand for each of the multiple paths.

13. The node apparatus as claimed in claim 12, wherein a ratio of a protection bandwidth to allocate to a detected path is set beforehand depending on time for each of the multiple paths.

14. The node apparatus as claimed in claim 10, further comprising a part configured to conduct a path setting to the protection path in order to protect a path where an error rate exceeds a first threshold which is set beforehand in the multiple paths being set to the multiple working paths.

15. The node apparatus as claimed in claim 14, wherein the switch part switches the detected path from the working path in which the path setting is conducted, to the protection path when the failure is detected on the path where the error rate exceeds the first threshold.

16. The node apparatus as claimed in claim 15, wherein in first data transmitted by the path where the error rate exceeds a first threshold, second data of a rate corresponding to the first threshold are transmitted by the allocation bandwidth determined within the entire bandwidth of the protection path where the path setting is conducted, for each of the first allocation bandwidth and the second allocation bandwidth which is the allocation bandwidth.

17. The node apparatus as claimed in claim 15, wherein the switch part switches the path in which the error rate exceeds a second threshold from the working path to the protection path where the path is set when the error rate of a path being set to the working path exceeds the second threshold being greater than the first threshold.

18. A node apparatus in a network connecting between nodes by multiple working paths and a protection path, the node apparatus comprising:
    a first transmission part configured to transmit partial data respective to the multiple working paths by using the protection path;
    a switch part configured to switch a working path where a failure is detected to the partial data transmitted by using the protection path when the failure is detected;
    a determination part configured to determine respective bandwidths of the protection path which are assigned for two or more working paths in each of which the failure is detected at a receiver node; and
    a second transmission part configured to transmit data of the two or more working paths in each of which the failure is detected, by using the respective bandwidths determined within the protection path.

* * * * *